United States Patent
Kobayashi et al.

(10) Patent No.: US 7,335,451 B2
(45) Date of Patent: Feb. 26, 2008

(54) PATTERN FORMING BODY

(75) Inventors: Hironori Kobayashi, Tokyo (JP); Kaori Yamashita, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 560 days.

(21) Appl. No.: 10/817,458

(22) Filed: Apr. 2, 2004

(65) Prior Publication Data

US 2005/0031973 A1    Feb. 10, 2005

(30) Foreign Application Priority Data

Apr. 7, 2003 (JP) .............................. 2003-102987
May 21, 2003 (JP) .............................. 2003-143971

(51) Int. Cl.
*G02B 5/20* (2006.01)

(52) U.S. Cl. ............................................. 430/7; 430/14

(58) Field of Classification Search ...................... None
See application file for complete search history.

(56) References Cited

U.S. PATENT DOCUMENTS 6,294,313 B1 * 9/2001 Kobayashi et al. ......... 430/302

2003/0008217 A1 * 1/2003 Kobayashi .................. 430/5

FOREIGN PATENT DOCUMENTS

| JP | 59-075205 | 4/1984 |
| JP | 09-203803 | 8/1997 |
| JP | 2000-227513 A * | 8/2000 |

* cited by examiner

*Primary Examiner*—John A. McPherson
(74) *Attorney, Agent, or Firm*—Seyfarth Shaw LLP

(57) ABSTRACT

A pattern forming body is provided or a color filter, wherein the color filter can be manufactured efficiently by a simple process without any cracks and no influence to an alignment of a liquid crystal. A pattern forming body is provided comprising: a base material; a photocatalyst containing layer, comprising at least a photocatalyst, formed on the base material; a protecting part formed on the photocatalyst containing layer; a property variable layer, whose surface property is varied by a function of a photocatalyst due to an energy irradiation, formed so as to cover the photocatalyst containing layer and the protecting part; and a property-varied pattern which is a property varied property variable layer.

33 Claims, 3 Drawing Sheets

PATTERN FORMING BODY

BACKGROUND OF THE INVENTION

1. Field of the Invention

The present invention relates to a pattern forming body which can be used for a color filter or the like used for a color liquid crystal display.

2. Description of the Related Art

Recently, accompanied by development of the personal computers, in particular, development of the portable personal computers, demand to the liquid crystal displays, particularly color liquid crystal displays tends to be increasing. However, since the color liquid crystal displays are expensive, cost down is highly requested. In particular, cost down to the color filters, which accounts for a large proportion in terms of the cost, is highly requested.

In general, such a color filter comprises coloring patterns of the three primary colors including red (R), green (G) and blue (B). The liquid crystal functions as a shutter by switching electrodes corresponding each pixel of R, G, and B on or off, thereby light pass through each pixel of R, G, and B so that the color display is carried out.

As the methods for manufacturing a color filter conventionally executed, for example, a dying method can be presented. In the dying method, a colored pattern is obtained by first forming a water soluble polymer material, as the dying material, on a glass substrate, patterning the same into a desired shape by a photolithography process, and then soaking the obtained pattern in a dye bath. By repeating the same for three times, R, G, and B color filter layers are formed.

Moreover, as another method, a pigment dispersion method can be presented. In the method, a single color pattern is obtained by first forming a pigment dispersed photo sensitive resin layer on a substrate, and patterning the same. By repeating this process for three times, R, G, and B coloring layers are formed.

As still another method, an electro deposition method, a method of dispersing a pigment in a thermosetting resin, printing three times for R, G, and B, and thermally curing the resin, or the like can be presented.

However, in any method, the same process should be repeated for three times for coloring the three colors of R, G, and B, a problem of a high cost, and a problem of the yield deterioration due to the process repetition are involved.

As a method for manufacturing a color filter which can solve the above mentioned problem, a method for forming a coloring layer, in which coloring inks are sprayed by an ink jet method, is proposed (Japanese Patent Application Laid Open (JP-A) No. 59-75205). In the reference, methods to help an ink to fix are disclosed. That is, when an ink having a good wettability to a glass substrate is used, bounding convex parts are preliminarily printed with a material having a poor wettability to an ink, and when an ink having a poor wettability to a glass is used, a pattern is preliminarily formed with a material having a good wettability to the ink.

Moreover, as another method for manufacturing a color filter by forming coloring layers by discharging coloring ink by the ink jet method, a method in which a concave part is treated with a lyophilic treating agent is reported (JP-A No. 9-203803). In this method, convex part is preliminarily formed on a substrate. After making the convex part liquid repellent, the entier surface of the substrate is treated with the lyophilic treating agent.

Furthermore, still another method for manufacturing a colot filter by forming coloring layers by discharging coloring ink by the ink jet method, a method which uses a wettability variable layer utilizing a photocatalyst reaction is proposed by the present inventors (Japanese Patent No. 3381146). In this method a photocatalyst containing layer comprising a photocatalyst is formed on a transparent base material with light shielding part formed, and on the photocatalyst containing layer, a property variable layer, whose property is varied by a function of a photocatalyst due to an energy irradiation, is formed. After that, a property-varied pattern is formed by irradiating the property variable layer, thus providing a coloring layer to the property varied parts. By this method, it is possible to form a coloring layer easily by utilizing the property of the wettability variable layer.

However, in this method, there is a problem of inducing a crack in the photocatalyst containing layer, due to a difference in thermal expansion rate, when the photocatalyst containing layer is formed because the photocatalyst containing layer is formed on the light shielding part. Moreover, there is a problem that an alignment of a liquid crystal may be influenced by a conductivity of the photocatalyst containing layer, when an electrode layer is provided on the color filter, since the thickness of the property variable layer is thin.

SUMMARY OF THE INVENTION

In view of the above, provision of a pattern forming body and a color filter, which can be formed efficiently by simple processes, with no cracks nor influence to a liquid crystal alignment is desired.

The present invention provides a pattern forming body comprising: a base material; a photocatalyst containing layer, comprising at least a photocatalyst, formed on the base material; a protecting part formed on the photocatalyst containing layer; a property variable layer, whose surface property is varied by a function of a photocatalyst due to an energy irradiation, formed so as to cover the photocatalyst containing layer and the protecting part; and a property-varied pattern which is a property varied property variable layer.

In the present invention, since the property variable layer is provided, a pattern forming body of, for example, a pixel part of a color filter or the like can be formed easily by utilizing a property-varied pattern, whose property is varied by a function of a photocatalyst due to an energy irradiation. Moreover, even though the energy is irradiated to the entire surface of the property variable layer from the property variable layer side or form the base material side, if the base material is transparent, since the protecting part is formed in between the property variable layer and the photocatalyst containing layer, the function of the photocatalyst in the photocatalyst containing layer dose not exhibit in an area where the protecting part is formed so that the property of the property variable layer is not varied. Thereby, a property-varied pattern, wherein only the property of the property variable layer where the protecting part is not formed is varied, can be formed easily.

Moreover, the present invention provides a color filter wherein the base material of the above mentioned pattern foriming body is a transparent base material, the protecting part is a light shielding part, and a pixel part is formed according to the property-varied pattern.

In the present invention, the pixel part can be formed easily by utilizing the property difference of the property-varied pattern. Thereby a color filter having a high precision pixel part, and also preferable in view of a manufacturing efficiency and a cost can be provided. Moreover, even in a case where the electrode layer is formed on the pixel part, the alignment of the liquid crystal is not influenced by the photocatalyst containing layer since the light shielding part and the pixel part are formed in between the electrode layer and the photocatalyst containing layer. Therefore, a high quality color filter can be provided.

Moreover, in the present invention, the property variable layer may be a wettability variable layer whose contact angle to a liquid is reduced by a function of a photocatalyst due to an energy irradiation. Thereby, the wettability of the property-varied pattern can be made higher than other areas. By utilizing this wettability difference, pixel part can be formed easil, for example, by the ink jet method.

In the above invention, the wettability variable layer may be a layer containing an organo polysiloxane. Thereby, the wettability can be varied as mentioned above.

In the present invention, it is preferable that the organo polysiloxane is an organo polysiloxane as a hydrolyzed condensate or a cohydrolyzed condensate of one kind or two or more kinds of silicon compounds represented by $Y_n SiX_{(4-n)}$ (Here, Y is an alkyl group, a fluoro alkyl group, a vinyl group, an amino group, a phenyl group, an epoxy group, or an organic group containing them, X is an alkoxyl group, or a halogen, and n is an integer from 0 to 3.). By using such organo polysiloxane, the property concerning the wettability variation as mentioned above can be exibited.

Moreover, in the present invention, a carbon number of Y, which constitutes the organo polysiloxane, is preferably in a range of 1 to 20. Thereby, the organo polysiloxane before the energy irradiation can be made liquid repellent with the above Y. Ane further, Y being decomposed and removed by a function of a photocatalyst due to an energy irradiation, the area can be made lyophilic.

Further, in the present invention, the wettability variable layer may be a monolayer. Thereby, the wettability variable layer can be made minutely and evenly so that high precision and even pixel part can be formed on the property-varied pattern whose wettability is varied by a function of a photocatalyst due to an energy irradiation.

In the present invention, it is preferable that the monolayer is formed from a silane compound comprising an organic chain. By using such a silane compound, the above mentioned monolayer can be formed easily.

Moreover, a carbon number which constitutes the organic chain is preferably in a range of 1 to 20. The monolayer before the energy irradiation can be made liquid repellent with the organic chain. And further, the organic chain being decomposed and the like by a function of a photocatalyst due to an energy irradiation, the area can be made lyophilic.

In the present invention, it is preferable that the silane compound is a fluoroalkylsilane. Thereby, the liquid repellency of the area before the energy irradiation can be made higher so that the wettability difference to the property-varied pattern, which is made lyophilic by a function of a photocatalyst due to an energy irradiation, can be made higher.

Moreover, in the present invention, the property variable layer may be a decomposition removal layer which is decomposed and removed by an action of a photocatalyst due to an energy irradiation. Thereby, concave part can be formed on the surface of the property variable layer as the property-varied pattern. Thus, by utilizing the surface convex-concave, the pixel part can be formed easily, for example, by the ink jet method and the like.

In the above invention, it is preferable that a contact angle of the decomposition removal layer to a liquid having a 40 mN/m surface tension is 50° or more, and a contact angle of the photocatalyst containing layer to a liquid having a 40 mN/m surface tension is 49° or less. Thereby, the bared area where the decomposition removal layer is decomposed and removed can be made lyophilic area, and the area on the decomposition removal layer can be made liquid repellent area. Not only the surface convex-concave, but also the wettability difference can be used to form the pixel part so that a color filter having higher precision pixel part can be provided.

Here, the decomposition removal layer is preferably a monolayer. Thereby, the decomposition removal layer can be made minutely and evenly so that the decomposition removal layer can be decomposed and removed efficiently and evenly by a function of a photocatalyst due to an energy irradiation.

In the present invention, it is preferable that the pixel part is formed by an ink jet method. Since the pixel part can be formed only on the intended area, high precision pixel part can be formed by simple processes.

Moreover, it is preferable that a curing type ink is used for the pixel part formed by an ink jet method. Thereby, the pixel part can be formed easily.

Moreover in the above invention, the curing type ink may be an UV curing ink or a thermosetting ink. The high precision pixel part can be formed by using either curing type ink.

Further, in the present invention, the light shielding part may be formed by a thermal transfer method. Thereby, the high precision light shielding part can be formed by the simple processes, and the thickness of the light shielding part can be made thicker.

In the above invention, it is preferable that an adhesion improving layer is formed on the photocatalyst containing layer. Thereby, adhesion of between the light shielding part formed by the thermal transfer method and the photocatalyst containing layer can be made higher.

Moreover, in the present invention, an electrode layer may be formed on the pixel part. In the present invention, the color filter, which is not influenced by the conductivity of the photocatalyst containing layer, can be provided.

The present invention provides a method for manufacturing a color filter comprising:

a photocatalyst containing layer forming process of forming a photocatalyst containing layer, comprising at least a photocatalyst, on a transparent base material;

a light shieling part forming process of forming a light shielding part on the photocatalyst containing layer;

a property variable layer forming process of forming a property variable layer, whose property is varied by a function of a photocatalyst due to an energy irradiation, so as to cover the photocatalyst containing layer and the light shielding part;

a property-varied pattern forming process of forming a property-varied pattern which is the property varied layer whose property is varied by irradiating the property variable layer with an energy; and a pixel part forming process of forming a pixel part on the property-varied pattern.

In the present invention, in the property-varied pattern forming process, the surface property of the property variable layer formed in the property variable layer forming process can be varied by a function of a photocatalyst due to an energy irradiation. Thereby, the pixel part can be formed easily according to the property-varied pattern, which is the property varied property variable layer. Moreover, since the light shielding part forming process is carried out after the photocatalyst containing layer forming process, there will be no cracks in the photocatalyst containing layer because of the thickness of the light shielding part. Therefore, the high quality color filter can be provided.

Here, in the present invention, the energy irradiation can be carried out on the entire surface from the property variable layer side, or the energy irradiation can be carried out on the entire surface from the transparent base material. In the present invention, the light shielding part is formed in between the photocatalyst containing layer and the property variable layer. Therefore, in the area where the light shielding part is formed, the preoperty of the property variable layer is not varied because the function of a photocatalyst due to an energy irradiation dose not exhibit in this area. Thus, only the property of the property variable layer where the light shielding part is not formed can be varied.

Moreover, in the present invention, the energy irradiation may be carried out via a photomask. Thus, the property-varied pattern can be formed even in a case where the shape of the area where the light shielding part is not formed and the shape of the intended property-varied pattern are different.

Here, in the present invention, the property variable layer may be a wettability variable layer whose contact angle to a liquid is reduced by a function of a photocatalyst due to an energy irradiation. Thereby, in the pixel part forming process, the pixel part can be formed easily by utilizing the wettability of the property-varied pattern.

Moreover, in the present invention, the property variable layer may be a decomposition removal layer which is decomposed and removed by a function of a photocatalyst due to an energy irradiation. Thereby, in the pixel part forming process, the pixel part can be formed easily by utilizing the convex-concave formed on the surface of the decomposition removal layer.

Moreover, in the present invention, it is preferable that the pixel part is formed by an ink jet method using a curing type ink. Thereby, the high precision pixel part can be formed by the simple process.

In the present inventino, the light shielding part forming process may be carried out by a photolithography method. Thereby, the high precision light shielding part can be formed.

Moreover, in the present invention, the light shielding part forming process may be carried out by a thermal transfer method. Thereby, the high precision light shielding part can be formed by the simple process, and the thickness of the light shielding part can be made thicker.

Here, in the present invention, the method may comprise an adhesion improving layer forming process, of forming an adhesion improving layer, after the photocatalyst containing layer forming process. Thereby, the adhesion of the light shielding part formed by the thermal transfer method and the photocatalyst containing layer can be made higher.

In the above invention, the photocatalyst containing layer formed in the photocatalyst containing layer forming process may comprise an organo polysiloxane. Moreover, the photocatalyst containing layer formed in the photocatalyst containing layer forming process may comprise a silane coupling agent, and the silane coupling agent may be an simple substance, a hydrolyzed condensate or a cohydrolyzed condensate of one kind or two or more kinds of silicon compounds represented by $Y_nSiX_{(4-n)}$ (Here, Y is an alkyl group, a fluoro alkyl group, a vinyl group, an amino group, a phenyl group, an epoxy group, or an organic group containing them, X is an alkoxyl group, or a halogen, and n is an integer from 0 to 3.).

Thereby, the adhesion of the light shielding part formed by the thermal transfer method and the transparent base material can be made higher.

Further, in the above invention, the method preferably comprise an energy irradiating process, of irradiating the photocatalyst containing layer with the energy, after the light shielding part forming process. Thereby, the organic group existing on the surface of the photocatalyst containing layer can be decomposed and the like by a function of a photocatalyst due to an energy irradiation, so that the adhesion of the property variable layer formed on the photocatalyst containing layer and the photocatalyst containing layer can be made higher.

DESCRIPTION OF THE PREFERRED EMBODIMENTS

The present invention relates to a pattern forming body which can be used for a color filter and the like of a color liquid crystal display, to a color filter using the pattern forming body and to a method for manufactring a color filter. Hereinafter, each will be explained in detail.

A. Pattern Forming Body

First, a pattern forming body of the present invention will be explained. A pattern forming body of the present invention comprises: abase material; a photocatalyst containing layer, comprising at least a photocatalyst, formed on the base material; a protecting part formed on the photocatalyst containing layer; a property variable layer, whose surface property is varied by a function of a photocatalyst due to an energy irradiation, formed so as to cover the photocatalyst containing layer and the protecting part; and a property-varied pattern which is a property varied property variable layer.

Figure 1:
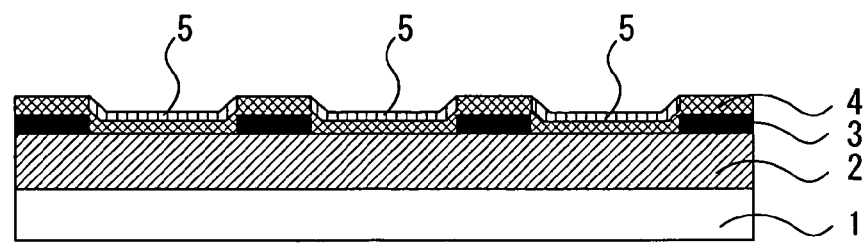
FIG. 1 is a schematic cross sectional view showing an example of a pattern forming body in the present invention.

The pattern forming body of the present invention, for example as shown in FIG. 1, comprises the base material 1, the photocatalyst containing layer 2 formed on the base material 1, the protecting part 3 formed on the photocatalyst containing layer 2, the property variable layer 4 formed so as to cover the protecting part 3 and the photocatalyst containing layer 2 and the property-varied pattern 5 which is the property varied property variable layer 4.

In the present invention, since the property variable layer is provided, the property-varied pattern, which is the property varied property variable layer, can be formed by a function of a photocatalyst due to an energy irradiation.

Thus, the pattern forming body of, for example, a pixel part of a color filter or the like can be formed easily by utilizing the property of the property-varied pattern.

Here, it is considered that the property of the property variable layer is varied because an alkyl group or the like is decomposed by active oxygen specie produced by the photocatalyst, which is excited by an energy irradiation, reactiong with an oxygen or water in the atmosphere. Therefore, in the present invention, the active oxygen specie is not produced in an area where the protecting part is formed in between the property variable layer and the photocatalyst containing layer. Thus, the property of the property variable layer is not varied in this area. Thereby, even though the entire surface is irradiated with the energy, a pattern forming body, wherein only the property of the property variable layer with no protecting part formed is varied, can be formed.

Here, the protecting part is not particularly limited as long as it is formed so as the property variable layer and the photocatalyst containing layer are not in contact. The protecting part may shield the energy, or it may have a transparency.

Moreover, the kind of the base material and the like is not particularly limited as long as the photocatalyst containing layer can be formed thereon. The base material is optionally selected according to the use of the pattern forming body. It mat be transparent, or it may not be transparent.

The pattern forming body as mentioned above may be used, for example, for a color filter of a color liquid crystal display, micro lenses or the like. Among them, it can be perticularly preferably used for a colo filter, wherein the protecting part is a light shielding part, and also, the pixel part is formed on the property-varied pattern.

About other components of the pattern forming body in the present invention not described in the above, those described later the section of the color filter can be used. Therefore, explanation is omited here.

B. Color Filter

Next, a color filter of the present invention will be explained.

Figure 2:
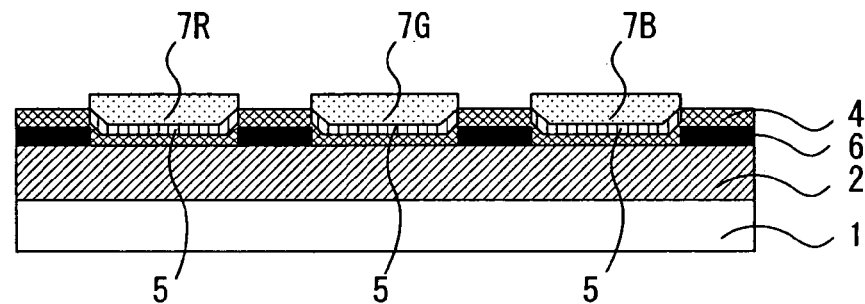
FIG. 2 is a schematic cross sectional view showing an example of a color filter in the present invention.

In the color filter of the present inveniton, the base material of the above mentioned pattern foriming body is a transparent base material, the protecting part is a light shielding part, and a pixel part is formed according to the property-varied pattern. As shown in FIG. 2, for example, the color filter of the present invention comprises the transparent base material 1, the photocatalyst containing layer 2 formed on the transparent base material 1, the light shielding part 6 formed on the photocatalyst containing layer 2, the property variable layer 4 formed so as to cover the light shielding part 6 and the photocatalyst containing layer 2, the pattern 5 which is the property varied property variable layer 4 and the pixel part 7R, 7G and 7B of red (R), green (G) and blue (B) formed on the property-varied pattern 5.

In the present invention, since the pixel part is formed according to the property-varied pattern, utilizing the property difference, the high precision pixel part can be formed easily. Here, in the present invention, since the light shielding part is formed, after forming the property variable layer for example, only the property of the property variable layer ca be varied in the area where the light shielding part is not formed, by irradiating the entire surface of the property variable layer with the energy. Thus, the propert-varied pattern can be formed easily in the area where the pixel part is to be formed. Moreover, as mentioned above, the light shielding part is formed on the photocatalyst containing layer, the high quality color filter can be provided with no cracks or the like occuring when the photocatalyst containing layer is formed on the light shielding part.

Further, in the color filter of the present invention, the electrode layer may be formed on the pixel part. In the present invention, the light shielding part and the pixel part are formed in between the formed elelctrode layer and the photocatalyst containing layer, it is possible to prevent the alignment of the liquid crystal provided on the electrode layer from being influenced by the photocatalyst containing layer.

Hereinafter, each component of such color filter will be explained.

1. Property Variable Layer

First, the property variable layer used for the color filter in the present invention will be explained. The kind of the property variation of the property variation of the property variable layer used for the color filter in the present invention is not particularly limited as long as it is formed so as to cover the below mentioned_photocatalyst containing layer and the light shielding part, and also, the property of the layer is varied by a function of a photocatalyst due to an energy irradiation.

Among the above, in the present invention, particularly two cases, namely the case where the property variable layer is a wettability variable layer wherein the wettability is varied so as the contact angle to a liquid is reduced by an action of the photocatalyst, and the case where the property variable layer is a decomposition removal layer which is decomposed and removed by an action of the photocatalyst, are preferable because it is easy to form the pixel part on the property-varied pattern. These wettability variable layer and decomposition removal layer will be hereinafter explained.

a. Wettability Variable Layer

First, the wettability variable layer used in the present invention will be explained. The wettability variable layer used in the present invention is a layer whose wettability varies so as a contact angle to a liquid is reduced by a function of a photocatalyst due to an energy irradiation. As mentioned abode, by using the wettability variable layer whose wettability is varied so as a contact angle to a liquid is reduced by energy irradiation, on the surface of the wettability variable layer, an energy irradiated area can be made into a lyophilic area and non-energy irradiated area can be made into a liquid repellent area. Thereby, as shown in FIG. 2, for example by the ink jet method, a pixel part forming coating solution, which forms the pixel part 7, will wet and spred only onto the property-varied pattern 5, whose wettability is reduced in the wettability variable layer 4. And the pixel part forming coating solution dose not wet and spred onto non-energy irradiated area, which is the liquid repellent area. Therefore, it is possible to form the pixel part easily only on the property-varied pattern so that a high quality color filter with no color mixture can be provided.

Here, the lyophilic area means an area having a small contact angle to a liquid and high wettability to the pixel part forming coating solution which forms the pixel part. On the other hand, the liquid repellent area means an area having a large contact angle to a liquid and poor wettability to the pixel part forming coating solution.

The contact angle of the wettability variable layer to a liquid of 40 mN/m is preferably 50° or more, more preferably 90° or more, in a part where energy is not irradiated, namely the liquid repellent area. This reason is that since the part where energy is not irradiated is a part of which liquid repellency is required in the present invention, the liquid repellency is not sufficient when the contact angle to a liquid is small, and in a case of coating the pixel part forming coating solution, a possibility of the pixel part forming coating solution being left also in the liquid repellent area, which is not preferable.

Also, the contact angle of the wettability variable layer to a liquid of 40 mN/m is preferably 49° or less, more preferably 10° or less in a part where energy is irradiated, namely the lyophilic area. This reason is that in a case where the contact angle to a liquid is high in a part where energy is irradiated, namely the lyophilic area, there is a possibility of the pixel part forming coating solution being repelled even in the lyophilic area when coating the pixel part forming coating solution, and there is a possibility of being difficult to pattern the lyophilic area with the functional part.

The contact angle to a liquid meant here was obtained in the following manner: the contact angles of the subject material to liquids having different surface tensions were measured (measured 30 seconds after liquid droplets are dripped from a micro-syringe) using a contact angle measuring device (CA-Z model, manufactured by Kyowa Interface Science Co., LTD.) to obtain the contact angle from the results of measurement or by making a graph based on these results. In this measurement, as liquids having different surface tensions, wetting index standard solutions manufactured by JUNSEI CHEMICAL CO., LTD.) were used.

Moreover, in a case where the wettability variable layer is used as the property variable layer, the pixel part will not be in directly contact to the photocatalyst containing layer, that is, the pixel part will not be in contact to the photocatalyst because the pixel part is formed on the wettability variable layer as mentioned above. Therefore, problems which might occur when the pixel part is in directly contact to the photocatalyst containing layer, for example, a problem of the pixel part being deteriorated, due to the organic group in the pixel part being oxidized or decomposed, can be prevented.

The wettability variable layer used in the present invention is not particularly limited as long as it has the above mentioned property, and also, it has a principal chain which is unlikely to be deteriorated nor decomposed by a function of a photocatalyst. In the present invention, among the above, a case where (1) an organo polysiloxane is contained in the wettability variable layer and a case where (2) the wettability variable layer is a monolayer, are preferable. Hereinafter, these two cases will be explained respectively.

(1) A Case Where an Organo Polysiloxane is Contained in the Wettability Variable Layer First, a case, where an organo polysiloxane is contained in the wettability variable layer, will be explained. In the present invention, since an organo polysiloxane is contained in the wettability variable layer, as mentioned above, the wettability can be reduced by a function of a photocatalyst due to an energy irradiation.

As an organo polysiloxane to be contained in the present invention, (a) an organo polysiloxane which provides high strength by hydrolyzing or polycondensating a chloro or alkoxy silane, or the like by the sol gel reaction or the like, (b) an organo polysiloxane such as an organo polysiloxane obtained by cross-linking a reactive silicone having the excellent water repellent property or oil repellent property, or the like can be presented for example.

In the above mentioned case (a), it is preferably an organo polysiloxane which is a hydrolyzed condensate or a co-hydrolyzed condensate of one kind or two or more kinds of silicon compounds represented by the general formula:

(Here, Y is an alkyl group, a fluoro alkyl group, a vinyl group, an amino group, a phenyl group, an epoxy group or an organic group containing them, X is an alkoxyl group, acetyl group or a halogen, and n is an integer from 0 to 3.).

Here, the alkoxy group represented by X is preferably a methoxy group, an ethoxy group, a propoxy group, or a butoxy group. Moreover, the number of carbon atoms of the entire organic group represented by Y is preferably in a range of 1 to 20, more preferably in a range of 5 to 10.

Thereby, when the wettability variable layer is formed, the surface will be liquid repellent by Y constituting the organo polysiloxane. Moreover, the surface will be lyophilic when the above Y is decomposed by a function of a photocatalyst due to an energy irradiation.

Moreover, particulaely when the organo polysiloxane with a fluoro alkyl group is used as Y which constitutes the organo polysiloxane, the wettability variable layer before the energy irradiation can be made into the one with a high liquid repellency. Therefore, when a high liquid repellency is required, an organo polysiloxane containing a fluoro alkyl group can be used preferably. As such organo polysiloxanes, a hydrolyzed condensate or a co-hydrolyzed condensate of one kind or two or more kinds of the following fluoro alkyl silanes can be presented specifically. Those generally known as a fluorine based silane coupling agent can be used.

$CF_3(CF_2)_3CH_2CH_2Si(OCH_3)_3$;
$CF_3(CF_2)_5CH_2CH_2Si(OCH_3)_3$;
$CF_3(CF_2)_7CH_2CH_2Si(OCH_3)_3$;
$CF_3(CF_2)_9CH_2CH_2Si(OCH_3)_3$;
$(CF_3)_2CF(CF_2)_4CH_2CH_2Si(OCH_3)_3$;
$(CF_3)_2CF(CF_2)_6CH_2CH_2Si(OCH_3)_3$;
$(CF_3)_2CF(CF_2)_8CH_2CH_2Si(OCH_3)_3$;
$CF_3(C_6H_4)C_2H_4Si(OCH_3)_3$;
$CF_3(CF_2)_3(C_6H_4)C_2H_4Si(OCH_3)_3$;
$CF_3(CF_2)_5(C_6H_4)C_2H_4Si(OCH_3)_3$;
$CF_3(CF_2)_7(C_6H_4)C_2H_4Si(OCH_3)_3$;
$CF_3(CF_2)_3CH_2CH_2SiCH_3(OCH_3)_2$;
$CF_3(CF_2)_5CH_2CH_2SiCH_3(OCH_3)_2$;
$CF_3(CF_2)_7CH_2CH_2SiCH_3(OCH_3)_2$;
$CF_3(CF_2)_9CH_2CH_2SiCH_3(OCH_3)_2$;
$(CF_3)_2CF(CF_2)_4CH_2CH_2SiCH_3(OCH_3)_2$;
$(CF_3)_2CF(CF_2)_6CH_2CH_2SiCH_3(OCH_3)_2$;
$(CF_3)_2CF(CF_2)_8CH_2CH_2SiCH_3(OCH_3)_2$;
$CF_3(C_6H_4)C_2H_4SiCH_3(OCH_3)_2$;
$CF_3(CF_2)_3(C_6H_4)C_2H_4SiCH_3(OCH_3)_2$;
$CF_3(CF_2)_5(C_6H_4)C_2H_4SiCH_3(OCH_3)_2$;
$CF_3(CF_2)_7(C_6H_4)C_2H_4SiCH_3(OCH_3)_2$;
$CF_3(CF_2)_3CH_2CH_2Si(OCH_2CH_3)_3$;
$CF_3(CF_2)_5CH_2CH_2Si(OCH_2CH_3)_3$;
$CF_3(CF_2)_7CH_2CH_2Si(OCH_2CH_3)_3$;
$CF_3(CF_2)_9CH_2CH_2Si(OCH_2CH_3)_3$; and
$CF_3(CF_2)_7SO_2N(C_2H_5)C_2H_4CH_2Si(OCH_3)_3$.

Moreover, as the above mentioned reactive silicone of the above mentioned (b), compounds having a skeleton represented by the following general formula can be presented.

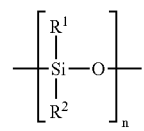

In the above general formula, n is an integer of 2 or more, $R^1$, $R^2$ each are a substituted or non substituted alkyl, alkenyl, aryl or cyano alkyl group having 1 to 10 carbon atoms, and 40% or less of the entirety based on the molar ratio is a vinyl, a phenyl, or a halogenated phenyl. Moreover, those having $R^1$, $R^2$ as a methyl group are preferable since the surface energy becomes smallest, and it is preferable that a methyl group accounts for 60% or more based on the molar ratio. Moreover, at least one reactive group such as a hydroxyl group is provided in a molecular chain at the chain end or at the side chain.

Moreover, together with the above mentioned organo polysiloxane, a stable organo silicone compound which is not cross-linked such as a dimethyl polysiloxane can be mixed.

For the wettability variable layer in the present invention, a surfactant can further be contained. Specifically, hydrocarbon based ones of the NIKKOL BL, BC, BO, BB series manufactured by Nikko Chemicals Co., Ltd., fluorine based or silicone based nonionic surfactants such as ZONYL FSN, FSO manufactured by Du pont, SURFLON S-141, 145 manufactured by Asahi Glass Company, MAGAFAKKU F-141, 144 manufactured by Dainippon Ink and Chemicals, Incorporated, FUTAGENT F-200, F251 manufactured by Neos Corp., UNIDYNE DS-401, 402 manufactured by Daikin Industries, Ltd., and FLUORAD FC-170, 176 manufactured by 3M, can be presented. Moreover, cationic surfactants, anionic surfactants, amphoteric surfactants can be used as well.

Moreover, for the wettability variable layer, in addition to the above mentioned surfactants, oligomers and polymers, such as a polyvinyl alcohol, an unsaturated polyester, an acrylic resin, a polyethylene, a diallyl phthalate, an ethylene propylene diene monomer, an epoxy resin, a phenol resin, a polyurethane, a melamine resin, a polycarbonate, a polyvinyl chloride, a polyamide, a polyimide, a styrene butadiene rubber, a chloroprene rubber, a polypropylene, a polybutylene, a polystyrene, a polyvinyl acetate, a polyester, a polybutadiene, a polybenzimidazol, a polyacrylic nitrile, an epichlorohydrine, a polysulfide, a polyisoprene and the like can be contained.

Such a wettability variable layer can be formed by dispersing the above mentioned components in a solvent, as needed with other additives, so as to prepare a coating solution, and coating the coating solution onto the below mentioned photocatalyst containing layer. As the solvent to be used, alcohol based organic solvents such as an ethanol and an isopropanol are preferable. The coating can be carried out by a known coating method such as spin coating, spray coating, dip coating, roll coating and bead coating. In the case an ultraviolet ray curing type component is contained, the wettability variable layer can be formed by carrying out a curing process by irradiating an ultraviolet ray.

In the present invention, the thickness of the wettability variable layer is preferably from 0.001 μm to 1 μm in terms of the wettability variation rate or the like by the photocatalyst, and particularly preferably it is in a range of 0.01 to 0.1 μm.

(2) A Case where the Wettability Variable Layer is a Monolayer

Next, a case, where the wettability variable layer is a monolayer, will be explained. When the wettability variable layer is a monolayer, the wettability variable layer can be made into a even and minute layer, and also, the below mentioned pixel part can be formed evenly with high precision. As such monolayer, a self-assembled monolayer can be listed for an example.

Here, a self-assembled monolayer is an organic thin layer formed by spontaneously assembled organic molecules, which forms aggregates at an interface of solid/liquid or solid/gas, so as to form a monolayer spontaneously. For example of the above, when a substrate formed from a certain material is exposed to a solvent or vapor of an organic molecule having high chemical affinity to the substrate material, the organic molecules will react chemically on the substrate surface and will be adsorbed. If the organic molecule is composed of two parts, that is, a functional group having a high chemical affinity and an organic chain which dose not chemically react with the substrate, and if the functional group having a high affinity is located at the end, the molecule will be adsorbed to the substrate with the reacting end on the substrate side and the organic chain on the outside. Since the assembled organic chains are stable as a whole, the organic molecules will spontaneously assemble in a chemical adsorption process. Since a chemical reaction between the substrate and the end functinoal group is required to the molecule adsoption, once the substrate surface is covered with the organic molecules and a monolayer is formed, no further adsorption of a molecule will occur. As a result, an organic monolayer of compactly assembled molecules with uniform alignment is obtained.

In the present invention, when the wettability variable layer is the self-assembled monolayer, a surface can be made lyophilic easily by removing the water repellent organic chain, existing on the surface of the wettability variable layer, by a function of a photocatalyst due to an energy irradiation. Thus, the property-varied pattern can be formed efficiently.

A material composing the monolayer used as such wettability variable layer is not particularly limited as long as the material has the above mentioned property. However, in the present invention, a silane compound having an organic chain is preferable. Thereby, the monolayer can be formed easily, and also, it is possible to exhibit the above mentioned property. Here, a carbon number constituting the organic chain is preferably in a range of 1 to 20, more preferably in a range of 5 to 10. Thereby, the wettability variable layer before the energy irradiation will be liquid repellent, and it will be lyophilic when the organic chain is decomposed by a function of a photocatalyst due to an energy irradiation.

As a silane compound having an organic chain, specifically, the materials explained in the section of the organo polysiloxane can be used. Among the above, a fluoroalkylsilane is preferable.

Such wettability variable layer formed from the monolayer can be formed by a thermal CVD method or a dip coating method. However, in view of maufacturing efficiency or the like, thermal CVD method is preferable in the present invention. As a preferable film forming condition by thermal CVD, the temperatuer is not particularly limited as long as it is lower than an allowable temperature limit of the below mentioned transparent base material, higher than a vaporizing temperature of the raw material, and also, lower than a decomposing temperature. Generally, temperature in a range of 50° C. to 200° C. is preferable.

Moreover, in the present invention, a known vacuum thermal CVD method can also be used. The degree of vacuum in the vacuum thermal CVD treatment can be set so as sufficient vapor pressure of the material can be obtained. The vapor pressure is optionally selected according to the kind of the material. Generally, the pressure can be 0.01 Torr to 10 Torr, more preferably 5 Torr or less. At this time, to accelerate the reaction with the substrate surface, it is preferabe to form the wettability variable layer by the vaccum CVD while heating the substrate. The heating temperature in this case is optionally selected according to the material of the substrate and the wettability variable layer. Generally, the temperatuer is set in a range of 40° C. to 100° C., more preferably, 80° C. or lower.

As thickness of the wettability variable layer formed in the present invention is determined by the kind of its monolayer. Generally, it is set in a range of 1 nm to 50 nm.

b. Decomposition Removal Layer

Figure 4:
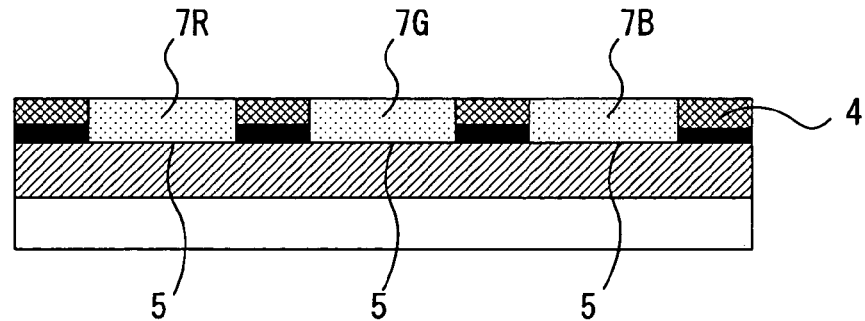
FIG. 4 is a schematic cross sectional view showing another example of a color filter in the present invention.

Next, a case, where the property variable layer used in the present invention is a decomposition removal layer, will be explained. In a case where the decomposition removal layer used in the present invention is a monolayer, it is a layer, wherein the energy irradiated part of the decomposition removal layer is decomposed and removed by a function of a photocatalyst due to an energy irradiation. Accordingly, since the energy irradiated part of the decomposition removal layer is decomposed and removed by a function of a photocatalyst, a pattern of the part having the decomposition removal layer and the part not having the same, that is, a pattern with convex-concave can be formed without carrying out the developing process or the cleaning process. In the present invention, when the proprty variable layer is such decomposition removal layer, as shown in FIG. 4 for example, the pixel part 7 is formed on the property-varied pattern 5, which is formed by decomposing and removing the decomposition removal layer 4 by a function of a photocatalyst due to an energy irradiation.

The decomposition removal layer is oxidized and removed by a function of a photocatalyst due to an energy irradiation so as to be vaporized or the like, it can be removed without a special post process such as the developing and cleaning process or the like, however, depending on the properties of the material of the decomposition removal layer, the cleaning process or the like may be carried out.

Moreover, in the decomposition removal layer used in the present invention, not only forming the convex-concave, it is preferable that the decomposition removal layer has a higher contact angle to a liquid compared to the below mentioned photocatalyst containing layer. Thereby, the area where the photocatalyst containing layer is bared by decomposing and removing the decomposition removal layer can be provided as the lyophilic area, and the area where the above mentioned decomposition removal layer is remaining can be provided as the liquid repellent area. Thus, the pixel part can be formed utilizing not only the convex-concave of the surface, but also the wettability difference.

Here, the lyophilic area means an area having a small contact angle to a liquid and high wettability to the pixel part forming coating solution which forms the pixel part. On the other hand, the liquid repellent area means an area having a large contact angle to a liquid and poor wettability to the pixel part forming coating solution.

The contact angle of the decomposition removal layer to a liquid of 40 mN/m is preferably 50° or more, more preferably 90° or more. This reason is that since the remaining property variable layer is a part of which liquid repellency is required in the present invention, the liquid repellency is not sufficient when the contact angle to a liquid is small, and a possibility of the pixel part forming coating solution being left also in the liquid repellent area not forming the pixel part, which is not preferable.

Also, the contact angle of the below mentioned photocatalyst containing layer to a liquid of 40 mN/m is preferably 49° or less, more preferably 10° or less in a part where no energy is irradiated. This reason is that, since the photocatalyst containing layer is a part where the lyophilic property is required in the present invention, there is a possibility of the pixel part forming coating solution being repelled even in the lyophilic area when coating the pixel part forming coating solution, and there is a possibility of being difficult to pattern the lyophilic area with the pixel part. Here, the contact angle to a liquid is a value measured by the above mentinoed method.

In this case, to make the surface lyophilic, the surface of the below mentioned photocatalyst containing layer may be treated. As an example of a material whose surface is treated to make the surface lyophilic, lyophilic surface treatment by plasma treatment using an argon or water can be listed. As a lyophilic layer to be formed on the photocatalyst containing layer, a silica film by sol-gen method of tetraethoxysilane can be listed for example.

As the film usable in the decomposition removal layer, specifically, a film of a fluorine based or hydrocarbon based liquid repellent resin or the like can be presented. The fluorine based or hydrocarbon based resins are not particularly limited as long as they have the liquid repellency, and they can be formed by dissolving the resins into a solvent and forming into a film by an ordinary film forming method such as a spin coating method.

Moreover, in the present invention, by using a functional thin film, that is, a self-assembled monolayer, a Langmuir Blodgett film, and a layer-by-layer self-assembled film, a film without a defect can be formed, and thus it is further preferable to use such film forming methods.

Here, the self-assembled monolayer, the Langmuir Blodgett film, and the layer-by-layer self-assembled film used in the present invention will be explained specifically.

(1) Self-Assembled Monolayer

As the material having the self-assembled film forming ability used in the present invention, for example, surfactant molecules such as a fatty acid, organic silicon molecules of alkyl trichloro silanes, alkyl alkoxides or the like, organic sulfur molecules of alkane thiols or the like, organic phosphoric acid molecules of alkyl phosphates or the like can be presented. As the general common property of the molecular structure, they have a relatively long alkyl chain, with the existence of a functional group to be interacted with the substrate surface on one side of the molecular end. The alkyl chain part is the source of the intermolecular force for the molecules to be two-demensionally packed with each other. The examples shown here have the simplest structure, and a self-assembled monolayers comprising various molecules, such as one having a functional group such as an amino group and a carboxyl group on the other end of the molecule, one whose alkylene chain part is an oxyethylene chain, one whose alkylene chain part is a fluorocarbon chain, a composite type chain thereof, or the like, have been reported. Moreover, there is a composite type self-assembled monolayer comprising a plurality of molecule species. Moreover, recently, a particle-like polymer having a plurality of functional groups (one functional group in some cases) represented by the dendrimer, and one layer of a straight chain-like (with a branched structure in some cases) polymer formed on a substrate surface (the latter is referred to as a polymer brush) are also considered to be the self-assembled monolayers in some cases. In the present invention, these are included to the self-assembled monolayers.

(2) Langmuir Blodgett Film

Once it is formed on a substrate, the Langmuir-Blodgett Film used in the present invention is not much different from the above mentioned self-assembled monolayer in terms of the form. The characteristics of the Langmuir Blodgett film lie in the forming method and the high two dimensional molecule packing property (high orientation, high order) derived therefrom. That is, in general, the Langmuir Blodgett film forming molecule is first developed on the gas liquid interface, and the developed film is condensed by the trough so as to be changed into a highly packed condensed film. Actually, it is transferred onto an appropriate substrate and used. According to the method schematically shown here, a monolayer film, and also, a multiple layer film of optional molecule layers can be formed. Moreover, not only a low molecule, but also a polymer, a colloid particle, or the like can be provided as the film material. As to the recent examples using the various materials, they are described in detail in the comprehensive bibliography by Tokuji Miyashita, et al. "Perspective to Nano Technology of the Soft Based Nano Device Creation" polymer 50 vol., September 644-647 (2001).

(3) Layer-By-Layer Self-Assembled Film

The layer-by layer self-assembled film in general is a film formed by laminating a material having at least two functional groups with a positive or negative charge consecutively on a substrate by adsorption and coupling. Since a material having a large number of functional groups is advantageous in terms of increase of the film strength and the durability, recently an ionic polymer (polymer electrolyte) is often used as the material. Moreover, particles having the surface charge such as a protein, a metal, and an oxide, that is, the "colloid particles" are also used frequently as the film forming substance. Furthermore, recently, a film actively utilizing the interaction weaker than the ion coupling, such as the hydrogen bonding, the coordinate bonding, and the hydrophobic interaction has been reported. As to the relatively recent examples of the layer-by-layer self-assembled films, they are described in detail in the comprehensive bibliography by Paula T. Hammond "Recent Explorations in Electrostatic Multilayer Thin Film assembly" Current Opinion in Colloid & Interface Science, 4, 430-442 (2000) although it is slightly eccentric to the material system with the electrostatic interaction provided as the driving force. Explaining the layer-by-layer self-assembled film refering to the most simple process as an example, it is a film formed by repeating the cycle of adsorption of a material having a positive (negative) charge-cleaning-adsorption of a material having a negative (positive) charge-cleaning by predetermined times. Unlike the Langmuir Blodgett film, the operation of development-condensation-transfer is not needed at all. Moreover, as it is apparent from the manufacturing method difference, the layer-by-layer self-assembled film generally does not have the two dimensional high orientation nor high order, unlike the Langmuir Blodgett film. However, the layer-by-layer self-assembled film and the manufacturing method thereof have many advantages, which have not been provided in the conventional film forming methods, such as easy formation of a dense film without a defect, and even film formation on a minutely rugged surface, a tube inner surface, a spherical surface, or the like.

Moreover, as to the film thickness of the decomposition removal layer, it is not particularly limited as long as it is a film thickness to the degree to be decomposed and removed by a function of a photocatalyst due to an energy irradiation. As the specific film thickness, although it depends drastically on to the kind of the energy to be irradiated, the material of the decomposition removal layer, or the like, in general it is preferably in a range of 0.001 µm to 1 µm, in particular in a range of 0.01 µm to 0.1 µm.

2. Photocatalyst Containing Layer

Next, the photocatalyst containing layer used in the present invention will be explained. The photocatalyst containing layer used in the present invention is not particularly limited as long as a configuration that the photocatalyst in the photocatalyst containing layer varies the property of the property variable layer formed thereon. The photocatalyst containing layer may be composed of a photocatalyst and a binder, or the photocatalyst containing layer may be film formed with a photocatalyst alone. Moreover, its surface may be lyophilic or liquid repellent. However, since the property variable layer and the like is formed on the photocatalyst containing layer, lyophilic is preferable.

Although the functional mechanism of the photocatalyst represented by a titanium oxide, which is described later, in the photocatalyst containing layer is not clear, it is considered that a carrier produced by the light beam irradiation influences the chemical structure of an organic substance by the direct reaction with a compound in the vicinity, or by the active oxygen specie produced in the presence of an oxygen and water. In the present invention, it is considered that the carrier influences the compound in the property variable layer formed on the photocatalyst containing layer.

As the photocatalyst used in the present invention, those known as photo semiconductors, such as a titanium oxide ($TiO_2$), a zinc oxide (ZnO), a tin oxide ($SnO_2$), a strontium titanate ($SrTiO_3$), tungsten oxide ($WO_3$), bismuth oxide ($Bi_2O_3$), and an iron oxide ($Fe_2O_3$) can be presented, and one kind or two or more kinds can be selected from the above and used as a mixture.

In the present invention, in particular, a titanium oxide can be used preferably since it has high band gap energy, it is chemically stable without the toxicity, and it can be obtained easily. There are an anatase type and a rutile type in the titanium oxides, and either can be used in the present invention, and the anatase type titanium oxide is preferable. The excitation wavelength of the anatase type titanium oxide is 380 nm or less.

As the anatase type titanium oxide, for example, a hydrochloric acid peptization type anatase type titania sol (STS-02 (average particle size 7 nm) manufactured by Ishihara Sangyo Kaisha, Ltd., ST-K01 manufactured by Ishihara Sangyo Kaisha, Ltd.), a nitric acid peptization type anatase type titania sol (TA-15 (average particle size 12 nm) manufactured by Nissan Chemical Industries, Ltd.), or the like can be presented.

With a smaller particle size of the photocatalyst, the photocatalyst reaction can be generated effectively, and thus it is preferable. An average particle size of 50 nm or less is preferable, and use of a photocatalyst of 20 nm or less is particularly preferable. Moreover, as the particle size of the photocatalyst is smaller, it is preferable because the roughness of the formed photocatalyst containing layer will become smaller. If the particle size of the photocatalyst is larger than 100 nm, the average surface roughness of the center line of the photocatalyst containing layer will be rough, the property of the non-exposed area of the photocatalyst containing layer will be varied, and also, the property variation of the exposed area will not be sufficient. Thus, it is not preferable.

The photocatalyst containing layer in the present invention may be one formed with the photocatalyst alone, or one formed as a mixture with a binder, as mentioned above.

In the case of the photocatalyst containing layer formed only with the photocatalyst, the efficiency in terms of the property variation of the property variable layer is improved so that it is advantageous in terms of the cost, such as the processing time reduction. In contrast, in the case of the photocatalyst containing layer formed with the photocatalyst and the binder, it is advantageous in terms of the formation easiness of the photocatalyst containing layer.

Moreover, in the present invention, when the below mentioned light shielding part is formed by the thermal transfer method, organic materials are used as the light shielding part. Such organic materials genarally have a poor adhesion to substances such as a titanium oxide, made from only inorganic materials so that it may be difficult to be formed on the photocatalyst containing layer made from only the titanium oxide. Therefore, when the light shielding part is formed by the thermal transfer method, the photocatalyst containing layer preferably contains a binder. Thereby, an organic group such as an alkyl group or the like will exist on the surface of the photocatalyst containing layer so that the adhesion of the light shielding part and the photocatalyst containing layer will be improved. When the photocatalyst containing layer is a layer containing the biner, if the below mentioned transparent base material is made from an inorganic material, the photocatalyst containing layer itself can act as an part which improves the ahesiveness of the transparent base material and the light shielding part.

Here, when the below mentioned light shielding part is formed by the thermal transfer method, it is preferable that a below mentioned adhesion improving layer is formed on the photocatalyst containing layer. Thereby, when the photocatalyst containing layer is formed from only inorganic materials such as a titanium oxide, the photocatalyst containing layer and the light shielding part can be formed with good adhesion so that the photocatalyst containing layer can be formed from only the photocatalyst, or the photocatalyst containing layer can contain the binder.

As the method for forming the photocatalyst containing layer formed only with the photocatalyst, for example, a sputtering method, a CVD method, and a method using a vacuum film formation method, such as a vacuum deposition method, can be presented. By forming the photocatalyst containing layer by the vacuum film formation method, a photocatalyst containing layer containing only a photocatalyst can be provided as an even film, and thereby, the property on the property variable layer can be varied evenly. Moreover, since it is formed only with the photocatalyst, compared with the case of using the binder, the property on the property variable layer can be varied efficiently.

Moreover, as another example of the method for forming the photocatalyst containing layer formed only with the photocatalyst, for example, in the case the photocatalyst is a titanium dioxide, a method of forming an amorphous titania on the base member, and changing the phase to a crystalline titania by baking, or the like can be presented. The amorphous titania used here can be obtained by, for example, hydrolyzing or dehydration condensating of a inorganic salt of titanium such as a titanium tetrachloride, and a titanium sulfide, or hydrolyzing, or dehydration condensating under the existence of an acid of an organic titanium compound such as a tetraethoxy titanium, a tetraisopropoxy titanium, a tetra-n-propoxy titanium, a tetrabutoxy titanium, and a tetramethoxy titanium. Next, by baking at 400° C. to 500° C., it can be denatured to an anatase type titania, and by baking at 600° C. to 700° C., it can be denatured to a rutile type titania.

Moreover, in the case of using a binder, it is preferable that the principal skeleton of the binder has a high bonding energy so as not to be decomposed by the photo excitation of the above mentioned photocatalyst. As an example of such binder, an organo polysiloxane or the like explained in the above section of the property variable layer can be presented.

In the case an organo polysiloxane is used as the binder accordingly, the above mentioned photocatalyst containing layer can be formed by dispersing the photocatalyst and the organo polysiloxane as the binder in a solvent as needed with the other additives so as to prepare a coating solution, and coating the coating solution on the transparent base material. As the solvent to be used, alcohol based organic solvents such as an ethanol, and an isopropanol are preferable. The coating can be carried out by a known coating method such as spin coating, spray coating, dip coating, roll coating and bead coating. In the case an ultraviolet ray curing type component is contained in the binder, the photocatalyst containing layer can be formed by carrying out a curing process by irradiating an ultraviolet ray.

Moreover, as the binder, an amorphous silica precursor can be used. The amorphous silica precursor is represented by the general formula $SiZ_4$. Z is preferably a silicon compound such as a halogen, a methoxy group, an ethoxy group, an acetyl group, or the like, a silanol as a hydrolysis product thereof, or a polysiloxane having a 3,000 or less average molecular weight.

Specifically, a tetraethoxy silane, a tetraisopropoxy silane, a tetra-n-propoxy silane, a tetrabutoxy silane, a tetramethoxy silane, or the like can be presented. Moreover, in this case, by homogeneously dispersing the precursor of an amorphous silica and the photocatalyst particles in a nonaqueous based solvent, forming a silanol on the transparent base material by the hydrolyzing by the moisture content in the air, and carrying out the dehydration polycondensation at an ordinary temperature, the photocatalyst containing layer can be formed. By carrying out the dehydration polycondensation of a silanol at 100° C. or more, the polymerization degree of the silanol is increased so that the film surface strength can be improved. Moreover, the bonding agents can be used alone or as a mixture of two or more kinds.

The photocatalyst content in the photocatalyst containing layer can be set in a range of 5 to 60% by weight, preferably 20 to 40% by weight. Moreover, the thickness of the photocatalyst containing layer is preferably in a range of 0.05 to 10 μm.

Moreover, as mentioned above, when the light shielding part is formed by the thermal transfer method, the above mentioned organo polysiloxane or materials usually used as a silane coupling agent is preferably used as the binder. Thereby, an organic group will exist on the surface of the photocatalyst containing layer so that the adhesion of the light shielding part and the transparent base material can be improved. Furthermore, there is an advantage that an organic group on the surface can be decomposed and removed easily by irradiating the photocatalyst containing layer with the energy after forming the light shielding part by the thermal transfer method. This is because it is possible to improve the adhesion of the transparent base material and the light shielding part by having an organic group on the surface of the photocatalyst containing layer. On the other hand, when the below mentioned property variable layer is formed so as to cover the photocatalyst containing layer and the light shielding part, the adhesion of the photocatalyst containing layer and the property variable layer can be improved by not having an organic group or the like on the surface of the photocatalyst containing layer.

As an example of the silane coupling agent used as such a binder, an simple substance, a hydrolyzed condensate or a cohydrolyzed condensate of one kind or two or more kinds of silicon compounds represented by $Y_nSiX_{(4-n)}$ (Here, Y is an alkyl group, a fluoro alkyl group, a vinyl group, an amino group, a phenyl group, an epoxy group, or an organic group containing them, X is an alkoxyl group, or a halogen, and n is an integer from 0 to 3.) can be used. Among the above, in the present inveniton, Y is preferably a vinyl group, an amino group or an epoxy group. Moreover, an alkoxy group represented by X is preferably a methoxy group, an ethoxy group, a propoxy group, or a butoxy group. Moreover, the number of carbon atoms of the entire organic group represented by Y is preferably in a range of 1 to 20, more preferably in a range of 5 to 10.

Further, in this case, the photocatalyst can be contained by quantity in a range of the same value as mentioned above.

Moreover, for the photocatalyst containing layer, in addition to the above mentioned photocatalyst and binder, a surfactant can be contained. Specifically, hydrocarbon based ones of the NIKKOL BL, BC, BO, BB series manufactured by Nikko Chemicals Co., Ltd., fluorine based or silicone based nonionic surfactants such as ZONYL FSN, FSO manufactured by Du Pont, SURFLON S-141, 145 manufactured by Asahi Glass Company, MAGAFAKKU F-141, 144 manufactured by Dainippon Ink and Chemicals, Incorporated, FUTAGENT F-200, F251 manufactured by Neos Corp., UNIDYNE DS-401, 402 manufactured by Daikin Industries, Ltd., and FLUORAD FC-170, 176 manufactured by 3M, can be presented. Moreover, cationic surfactants, anionic surfactants, amphoteric surfactants can be used as well.

Moreover, for the photocatalyst containing layer, in addition to the above mentioned surfactants, oligomers and polymers, such as a polyvinyl alcohol, an unsaturated polyester, an acrylic resin, a polyethylene, a diallylphthalate, an ethylene propylene diene monomer, an epoxy resin, a phenol resin, a polyurethane, a melamine resin, a polycarbonate, a polyvinyl chloride, polyamide, polyimide, a styrelene butadiene rubber, a chloroprene rubber, a polypropylene, a polybutylene, a polystyrene, a polyvinyl acetate, a polyester, a polybutadiene, a polybenzimidazol, a polyacrylic nitrile, an epichlorohydrine, a polysulfide, a polyisoprene, and the like can be contained.

3. Light Sheilding Part

Next, the light shielding part used in the present invention will be explained. The light shielding part used in the present inveniton is formed on the above mentioned photocatalyst containing layer, and in the color filter of the present inveniton, it has a function as a black matrix. Moreover, in the present invention, since the light shielding part is formed in between the photocatalyst containing layer and the property variable layer, the property of the property variable layer on the area where the light shielding part is formed will not be varied.

Such light shielding part in the present invention is not particularly limited as long as it shield a function of the photocatalyst containing layer, and also it can be used as a black matrix in a color filter, for example, the light shielding part may be a layer containing carbon fine particles, a metal oxide, an inorganic pigment, an organic pigment or the like in a resin binder. The thickness can be set in a range of 0.5 to 10 μm. Moreover, as the resin binder, a composition of one kind or a mixture of two or more kinds of aqueous resins such as a polyacrylic amide, a polyvinyl alcohol, a gelatin, a casein, a cellulose or the like can be used. Moreover, as the resin binder, an O/W emulsion type resin composition such as an emulsion of a reactive silicone or the like can be used.

Further, such light shielding part can be formed by forming a metal thin film of a chromium or the like by about 1,000 to 2,000 Å thickness by a sputtering method, a vacuum deposition method or the like, and then, patterning the thin film by a photolithography method. Further, either one of the below can be used: a one formed by patterning a resin layer of a polyimide resin, an acrylic resin, an epoxy resin or the like containing a light shielding particle such as a carbon fine particle; or a one formed by patterning a photosensitive resin layer containing a light shielding particle such as a carbon fine particle, metal oxide or the like.

Still more, it can be formed by forming the above mentioned resin layer on a film, placing it on the photocatalyst containing layer and transferring it by thermal transfer method by applying a heat only to an area where the light shielding part is formed. Here, when the light shielding part is formed by the photolithography method, curing by irradiating the energy using a photosensitive resin or the like is required. When the thickness of the light shielding part is thick, it maybe difficult to cure the center of the photosensitive resin completely. However, since the light shielding part is not required to be cured by the energy irradiation, when the light shielding part is formed by the thermal transfer method, the thickness can be made thicker. Therefore, there is an advantage that a light shielding part which is possible to prevent the color mixture of the below mentioned pixel part easily.

In the light shielding part formed by the thermal transfer method, specifically, the light shielding particle such as a carbon fine particle can be formed by a resin layer or the like such as epoxy containing resin or the like.

In the present invention, though it depends on the kind or the like of the intended color filter, the thickness of the light shielding part when formed by the thermal transfer method can be set generally in a range of 1 μm to 10 μm, particularly in a range of 1.5 μm to 3 μm. The materials and the method for forming the light shielding part will be explained in detail in the light shielding part forming process in the section of "C. Method for manufacturing a pattern forming body", therefore, the explanation here is omitted.

4. Property-Varied Pattern

Next, a property-varied pattern in the present invention will be explained. The property-varied pattern of the present invention is the property variable layer whose property is varied by a function of a photocatalyst due to an energy irradiation.

In the present invention, the property-varied pattern is formed in a pattern of the below mentioned pixel part. In the present invention, since the light shielding part is formed in between the property variable layer and the photocatalyst containing layer, even the entire surface is irradiated with the energy, the property of the property variable layer on the light shielding part is not varied, and it is possible to vary the property of the property variable layer only in the area where the light shielding part is not formed, the property-varied pattern can be formed, for example, by irradiating the entire surface with the energy from the property variable layer side or the transparent base material side.

Here, in the present invention, the irradiated energy is not particularly limited as long as it can vary the property of the property variable layer. Generally, it is set in a range of 400 nm or less, preferably in a range of 380 nm or less.

5. Pixel Part

Next, a pixel part used in the present invention will be explained. The pixel part used in the present invention is formed according to the property-varied pattern of the above mentioned property varied property variable layer. Such pixel part is formed in the three colors of red (R), green (G) and blue (B). The coloring pattern shape in the pixel part can be known arrangement such as a stripe type, a mosaic type, a triangle type, four-pixel arrangement and the like, and the coloring area in the pixel part can be set optionally.

In the present inveniton, materials used to form the pixel part depend on the methods for coloring the pixel part. As methods for coloring the pixel part, for example, coating a known ink by known coting methods such as spraying, dip coating, roll coating, bead coting or the like and vacuum film forming method can be listed. In the present invention, it is preferable that the pixel part is colored by an ink jet method.

That is because the above mentioned coloring methods require to repeat the same process for three times to color the three colors of red (R), green (G) and blue (B). Therefore, there are problems such as a high cost and a yield will be low because the process is repeated. By coloring the pixel part by the ink jet method, all colors can be colored at one time so that such problems will not occur. The inks for forming the pixel part in the ink jet method can be classified on the whole to the water based type and the oil based type. In the present inveniton, either type can be used, however, in terms of the surface tension, the water based inks are preferable.

In the water based inks used in the present inveniton, as a solvent, water alone, or a solvent mixture of water and a water soluble organic solvent can be used. In contrast, in the oil based inks, those having a high boiling point as the base can be used preferably for preventing choking of the head or the like. As the coloring agents used for these ink jet method inks, known pigments and dyes can be used widely. Moreover, it is also possible to contain soluble or insoluble resins in the solvent for improving the dispersing property and the fixing property. Additionally, the surfactants such as a nonionic surfactant, a cationic surfactant, and an amphoteric surfactant; the antiseptics; the corrosion preventing agents; the pH adjusting agents; the antifoaming agents; the ultraviolet ray absorbing agents; the viscosity adjusting agents; the surface tension adjusting agents, or the like may be added as needed.

Moreover, since an ordinary ink jet ink has a low suitable viscosity, it cannot contain a binder resin by a large amount. However, by granulating the coloring agent particles in the ink so as to be contained by the resin, the fixing ability can be provided to the coloring agent itself. Such an ink can be used in the present inveniton. Furthermore, the so-called hot melt ink or the UV curing ink can be used as well.

In the present inveniton, an curing type ink is preferably used. In particular, it is preferable to use the UV curing ink or the thermosetting ink.

By using the UV curing ink, after forming the pixel part by coloring by the ink jet method, the ink can be cured quickly by the UV irradiation so that the next process can be carried out immediately. Therefore, the color filter can be manufactured efficiently.

The UV curing ink contains a prepolymer, a monomer, an optical initiator and a coloring agent as the main components. As the prepolymer, any of the prepolymers such as a polyester acrylate, a polyurethane acrylate, an epoxy acrylate, a polyether acrylate, an oligo acrylate, an alkyd acrylate, a polyol acrylate, and a silicon acrylate can be used without limitation.

As the monomer, vinyl monomers such as a styrene, and a vinyl acetate; monofunctional acrylic monomers such as an n-hexyl acrylate, and a phenoxy ethyl acrylate; and polyfunctional acrylic monomers such as a diethylene glycol diacrylate, a 1,6-hexane diol diacrylate, an ester neopentyl glycol diacrylate hydroxyl piperate, a trimethylol propane triacrylate, and a dipenta erythritol hexaacrylate can be used. The above mentioned prepolymers and monomers can be used alone or as a mixture or two or more kinds.

As the photo polymerization initiator, one capable of obtaining the desired curing property can be used selectively from an isobutyl benzoin ether, an isopropyl benzoin ether, a benzoin ethyl ether, a benzoin methyl ether, a 1-phenyl-1,2-propadion-2-oxime, a 2,2-dimethoxy-2-phenyl acetophenone, a benzyl, a hydroxyl cyclohexyl phenyl ketone, a diethoxy acetophenone, a 2-hydroxy-2-methyl-1-phenyl propane-1-on, a benzophenone, a chloro thioxanthone, a 2-chloro thioxanthone, an isopropyl thioxanthone, a 2-methyl thioxanthone, a chlorine substituted benzophenone, a halogen substituted alkyl-allyl ketone, or the like. Additionally, as needed, the photo initiating auxiliary agents such as an aliphatic amine and an aromatic amine; the photo sensitizing agents such as a thioxanthone may be added.

Further, the thermosetting ink is characterized in that it contains at least a binder and bifunctional or trifunctional epoxy containing monomer. Moreover, in the thermosetting ink used in the present invention, a coloring agent, a dispering agent, a curing accelerator or other additives can be contained as required. Here, in the above mentioned thermosetting ink composition, the above mentioned components can be dissolved or dispersed in a solvent (diluent) to give fluidity and dischage ability suitable for applying to the ink jet method. Moreover, together with the thermosetting ink composition and the above mentioned bifunctional or trifunctional epoxy group containing monomer, four or more functional epoxy group containing resin can be combined in the thermosetting ink used in the present invention.

As the binder, either of a resin without polymerization reactivity or a resin with polymerization reactivity itself can be used, or 2 or more kinds of binders can be used in a combination.

For example, when a resin without polymerization reactivity is used as a binder, the bifunctional or trifunctional epoxy containing monomer or other thermosetting components in the thermosetting ink composition will be polymerized and cured by heating. As such non-polymerizing binder, a copolymer formed from two or more of, for example, an acrylic acid, a methacrylic acid, a methyl acrylate, a methyl methacrylate, a 2-hydroxyethylacrylate, a 2-hydroxyethylmethacrylate, a benzyl acrylate, a benzyl methacrylate, a styrene, a polystyrene macro monomer and a polymethyl methacrylate macro monomer can be used.

More specifically, an acrylic acid copolymers such as an acrylic acid/benzyl acrylate copolymer, an acrylic acid/methyl acrylate/styrene copolymer, an acrylic acid/benzyl acrylate/styrene copolymer, an acrylic acid/methyl acrylate/polystyrene macro monomer copolymer, an acrylic acid/methyl acrylate/polymethyl methacrylate macro monomer copolymer, an acrylic acid/benzyl acrylate/polystyrene macro monomer copolymer, an acrylic acid/benzyl acrylate/polymethyl methacrylate macro monomer copolymer, an acrylic acid/2-hydroxy ethyl acrylate/benzyl acrylate/polystyrene macro monomer copolymer, an acrylic acid/2-hydroxy ethyl acrylate/benzyl acrylate/polymethyl methacrylate macro monomer copolymer, an acrylic acid/benzyl methacrylate copolymer, an acrylic acid/methyl methacrylate/styrene copolymer, an acrylic acid/benzyl methacrylate/ styrene copolymer, an acrylic acid/methyl methacrylate/polystyrene macro monomer copolymer, an acrylic acid/methyl methacrylate/poly methyl methacrylate macro monomer copolymer, an acrylic acid/benzyl methacrylate/polystyrene macro monomer copolymer, an acrylic acid/benzyl methacrylate/polymethyl methacrylate macro monomer copolymer, an acrylic acid/2-hydroxy ethyl methacrylate/benzyl methacrylate/polystyrene macro monomer copolymer, an acrylic acid/2-hydroxy ethyl methacrylate/benzyl meth acrylate/poly methyl meth acrylate macro monomer copolymer and the like can be used.

Furthermore, a methacrylic acid copolymer such as a methacrylic acid/benzyl acrylate copolymer, a methacrylic acid/methyl acrylate/styrene copolymer, a methacrylic acid/benzyl acrylate/styrene copolymer, a methacrylic acid/methyl acrylate/polystyrene macro monomer copolymer, a methacrylic acid/methyl acrylate/poly methyl methacrylate macro monomer copolymer, a methacrylic acid/benzyl acrylate/polystyrene macro monomer copolymer, a methacrylic acid/benzyl acrylate/polymethyl methacrylate macro monomer copolymer, a methacrylic acid/2-hydroxy ethyl acrylate/benzyl acrylate/polystyrene macro monomer copolymer, a methacrylic acid/2-hydroxy ethyl acrylate/benzyl acrylate/polymethyl methacrylate macro monomer copolymer, a methacrylic acid/benzyl methacrylate copolymer, a methacrylic acid/methyl methacrylate/styrene copolymer, a methacrylic acid/benzyl methacrylate/styrene copolymer, a methacrylic acid/methyl methacrylate/polystyrene macro monomer copolymer, a methacrylic acid/methyl meth acrylate/poly methyl methacrylate macro monomer copolymer, a methacrylic acid/benzyl methacrylate/polystyrene macro monomer copolymer, a methacrylic acid/benzyl methacrylate/polymethyl methacrylate macro monomer copolymer, a methacrylic acid/2-hydroxy ethyl meth acrylate/benzyl methacrylate/poly styrene macro monomer copolymer, a methacrylic acid/2-hydroxy ethyl methacrylate/benzyl methacrylate/polymethyl methacrylate macro monomer copolymer and the like can be listed.

As the above mentioned non-polymerizing binder, a methacrylic acid/benzyl methacrylate copolymer, a methacrylic acid/benzyl methacrylate/styrene copolymer, a benzyl methacrylate/styrene copolymer, a benzyl methacrylate macro monomer/styrene copolymer, a benzyl methacrylate/styrene macro monomer copolymer and the like are particularly preferable.

On the other hand, as the binder with polymerization reactivity, an oligomer or a polymer with a larger moleculer weight than an oligomer formed by introducing a thermal polymerizing functional group such as an epoxy group to a non-polymerizing binder molecule can be used. The polymerizing binder molecules will be polymerized with other binders, also, they will be polymerized with a bifunctional or multifunctional multifunctional monomer and other polymerizing monomers so as to be thermally set.

As a thermal polymerizing binder, for example, a homopolymer or a copolymer of one kind or two or more kinds of monomers containing an ethylene unsaturated bonding and an epoxy group such as: a (meth) acrylates such as a glycidyl acrylate, a glycidyl methacrylate, an α-ethyl glycidyl acrylate, an α-n-propyl glycidyl acrylate, an α-n-butyl glycidyl acrylate, an acrylic acid-3,4-epoxybutyl, a methacrylic acid-3,4-epoxybutyl, a methacrylic acid-4,5-epoxypentyl, an acrylic acid-6,7-epoxyheptyl, a methacrylic acid-6,7-epoxyheptyl, an α-ethyl acrylate-6,7-epoxyheptyl and the like; a vinyl glycidylethers such as an o-vinylphenyl glycidylether, a m-vinylphenyl glycidylether, a p-vinylphenyl glycidylether, an o-vinylbenzyl glycidylether, a m-vinylbenzyl glycidylether, a p-vinylbenzyl glycidylether and the like; a 2,3-diglycidyl oxystyrene, a 3,4-diglycidyl oxystyrene, a 2,4-diglycidyl oxystyrene, a diglycidyl oxystyrene, a 2,6-diglycidyl oxystyrene, a 5-vinylpyrogallol triglycidylether, a 4-vinylpyrogallol triglycidylether, a vinylfluoroglycinol triglycidylether, a 2,3-dihydroxymethyl styrenediglycidylether, a 3,4-hydroxymethyl styrenediglycidylether, a 2,4-dihydroxymethyl styrenediglycidylether, a 3,5-dihydroxymethyl styrenediglycidylether, a 2,6-dihydroxymethyl styrenediglycidylether, a 2,3,4-trihydroxymethyl styrenetriglycidylether, a 1,3,5-trihydroxymethyl styrenetriglycidylether and the like can be used.

Moreover, a copolymer of one kind or two or more kinds of the above monomers containing an ethylene unsaturated bonding and an epoxy group and the below mentioned monomers not containing an epoxy group can be used as a thermal polymerizing binder. As a monomer not containing an epoxy group, an acrylic acid, a methacrylic acid, a methyl acrylate, a methyl methacrylate, a 2-hydroxyethyl acrylate, a 2-hydroxyethyl methacrylate, a benzyl acrylate, a benzyl methacrylate, a styrene, polystyrene macro monomer, a polymethyl methacrylate macro monomer and the like can be listed for example.

Moreover, the binder is generally blended by a ratio of 1 to 50 wt % to the total solid amount of the thermosetting ink composition. Here, the solid amount of the thermosetting ink composition for determining the blending ratio includes all components except for a solvent, and a polymerizing monomer in liquid form is included in the solid amount.

Here, in examples of the color filter of the present invention shown in FIG. 2 and the like, all the pixel parts of the three colors of red (R), green (G) and blue (B) are formed on one property variable layer and the photocatalyst containing layer. However, the present invention is not limited to the above, for example, the present invention includes a configuration in which the pixel parts are formed on a plurality of the property variable layer and the photocatalyst containing layer, such as the property variable layer and the photocatalyst containing layer for the red color pixel part, the property variable layer and the photocatalyst containing layer for the green color pixel part and the property variable layer and the photocatalyst containing layer for the blue color pixel part.

6. Transparent Base Material

Next, a transparent base material used in the present invention will be explained. In the present invention, as shown in FIG. 2, the above mentioned property variable layer is formed on the transparent base material 1.

Such transparent base material is not particularly limited as long as it is conventionally used for a color filter. For example, a transparent rigid material without flexibility such as a quartz glass, a pyrex (registered trademark), and a synthetic quartz plate, or a transparent flexible material having flexibility such as a transparent resin film and an optical resin plate can be used. Among them, since the 7059 glass manufactured by Corning Incorporated is a material having a small thermal expansion coefficient, is excellent in size stability and in workability in a high temperature heating process, and it is a non alkaline glass not containing an alkaline component in the glass, it is particularly suitable for a color filter for a color liquid crystal display by an active matrix method.

In the present invention, a transparent one is generally used as the transparent base material, however, a reflective substrate or a substrate colored in white can be used as well. Moreover, for transparent base material, those with a surface treatment applied as needed, to prevent alkaline elution, to provide a gas barrier property, or for other purposes, can be used as well.

Further in the present invention, when the above mentioned light shielding part is formed by the thermal transfer method, and also the photocatalyst containing layer containes a binder such as a silane coupling agent, among the above mentioned transparent base material, the one made from inorganic materials such as quartz glass is preferable. This is because it is possible to show the advantage of the present invention that the the binder contained in the photocatalyst containing layer will improve the adhesion of the light shielding part and the transparent base material.

7. Color Filter

Next, a color filter of the present invention will be explained. The color filter of the present invention is not particularly limited as long as it comprises the transparent base material, the photocatalyst containing layer formed on the transparent base material, the light shielding part formed on the photocatalyst containing layer, the property variable layer formed so as to cover the photocatalyst containing layer and the light shielding part and the pixel part formed according to the property-varied pattern which is the property varied property variable layer.

Here, in the present invention, an electrode layer may be comprised on the pixel part. In the present invention, even if the electrode layer is formed on the pixel part, since the pixel part and the light shielding part is formed in between the electrode layer and the photocatalyst containing layer, a high quality color filter, wherein the electrode layer is not influenced by the conductivity of the photocatalyst containing layer, can be obtained.

Figure 3:
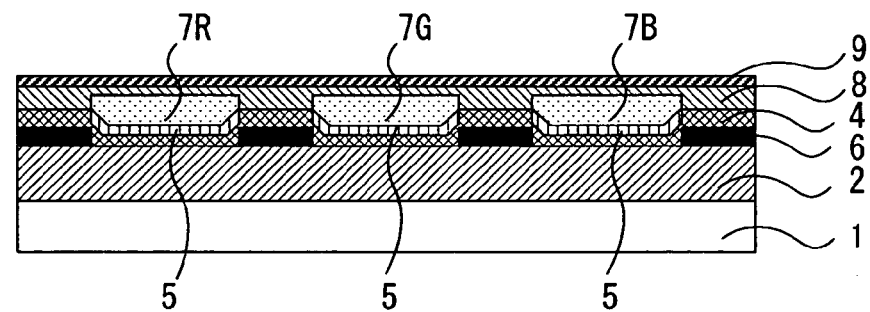
FIG. 3 is a schematic cross sectional view showing another example of a color filter in the present invention.

Moreover, as shown in FIG. 3 for example, the color filter of the present invention may comprise: the transparent base material 1; the photocatalyst containing layer 2 formed on the transparent base material 1; the light shielding part 6 formed on the photocatalyst containing layer 2; the property variable layer 4 formed so as to cover the light shielding part 6 and the photocatalyst containing layer 2; the pattern 5 which is the property varied property variable layer 4; the pixel part 7R, 7G and 7B of red (R), green (G) and blue (B) formed on the property-varied pattern 5; the protecting layer 8 formed on the pixel parts 7; and the electrode layer 9 formed on the protecting layer 8. The concave-convex of the surface can be flattened by the protecting layer so that a high quality color filter, wherein the electrode layer formed on the protecting layer will not be disconnected, can be obtained.

Further, in the present invention, an alignment layer or the like may be formed as needed. For such electrode layer, protecting layer, alignment layer or the like, the materials generally used for the color filter can be used.

8. Others

Other than the above mentioned components, the color filter of the present invention may compose an adhesion improving layer on the photocatalyst containing layer. As mentioned above, the light shielding part may be formed by the thermal transfer method in the present invention. In that case, when the photocatalyst containing layer is made only from inorganic materials such as titanium oxide, the adhesion between the light shielding part formed from organic materials and the photocatalyst containing layer may be poor.

In the present inveniton, as such adhesion improving layer, the binders explained in the section of the photocatalyst containing layer can be used. Among the above, a silane coupling agent is preferably used. Thereby, the adhesion between the photocatalyst containing layer and the light shielding part formed by the thermal transfer method can be improved.

C. Method for Manufacturing Color Filter

Next, method for manufacturing a color filter according to the present invention will be explained. The method for manufacturing a color filter according to the present invention comprises:

a photocatalyst containing layer forming process of forming a photocatalyst containing layer, comprising at least a photocatalyst, on a transparent base material;

a light shieling part forming process of forming a light shielding part on the photocatalyst containing layer;

a property variable layer forming process of forming a property variable layer, whose property is varied by a function of a photocatalyst due to an energy irradiation, so as to cover the photocatalyst containing layer and the light shielding part;

a property-varied pattern forming process of forming a property-varied pattern which is the property varied layer whose property is varied by irradiating the property variable layer with an energy; and a pixel part forming process of forming a pixel part on the property-varied pattern.

In the method for manufacturing a color filter according to the present invention, as shown in FIG. 5 for an example, a photocatalyst containing layer forming process (FIG. 5A) is carried out at first, wherein the photocatalyst containing layer 2 is formed on the transparent base material 1, and then, a light shielding part forming process (FIG. 5B) is carried out, wherein the light shielding part 6 is formed the photocatalyst containing layer 2. When the photocatalyst containing layer is formed on the light shielding part, there is a possibility of cracks occurring in the photocatalyst containing layer due to the thickness of the light shielding part. However, since the light shielding part 6 is formed on the photocatalyst containing layer 2 in the present invention, occuring of the cracks can be prevented.

Figure 5A:
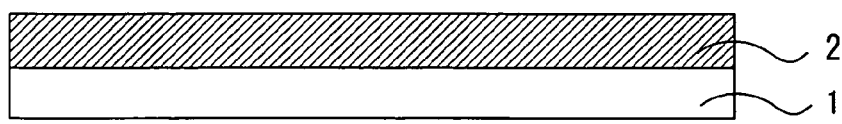
FIGS. 5A, 5B, 5C, 5D, 5E and 5F are process diagrams showing an example of a method for manufacturing a color filter according to the present invention.
Figure 5B:
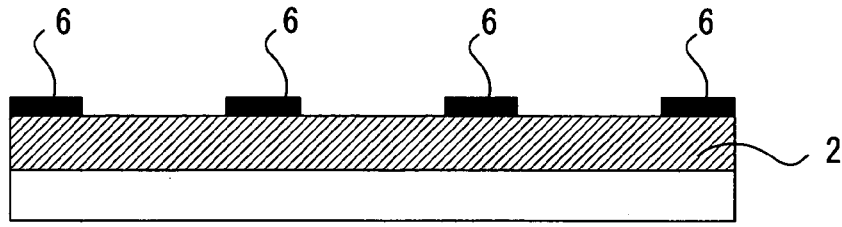
Figure 5C:
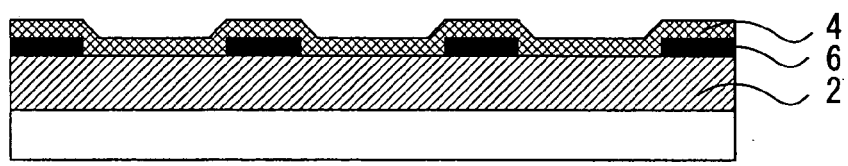
Figure 5D:
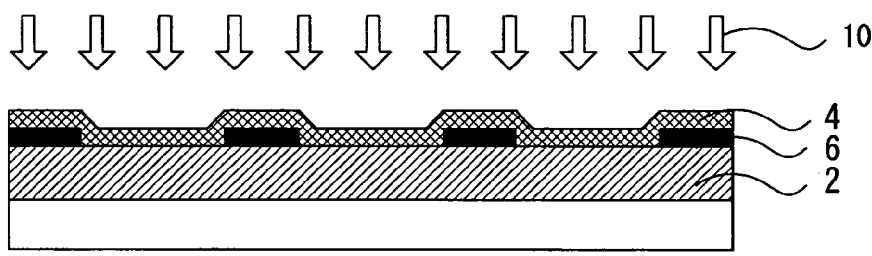
Figure 5E:
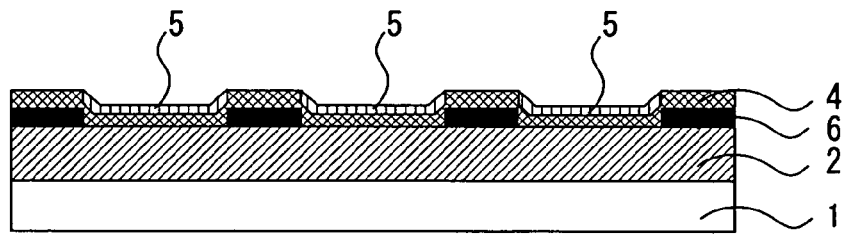
Figure 5F:
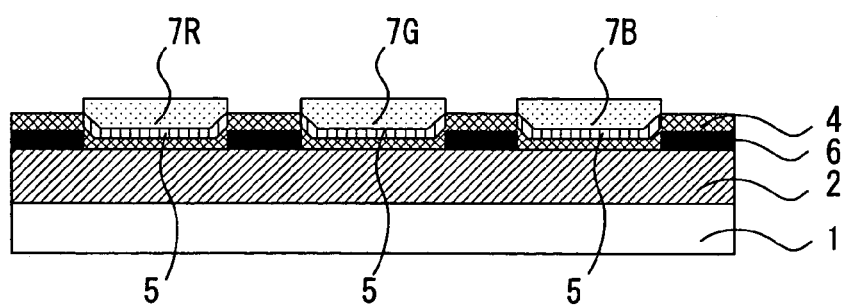

Next, a property variable layer forming process (FIG. 5C) is carried out, wherein the property variable layer 4 is formed so as to cover the light shielding part 6 and the photocatalyst containing layer 2, and the energy 10 is irradiated to the property variable layer 4 (FIG. 5D). The property-varied pattern 5, which is the propert varied property variable layer 4 by a function of a photocatalyst contained in the photocatalyst containing layer 2 due to the energy 10 irradiation, is formed. At this time, in the area where the light shielding part 6 is formed, since the photocatalyst containing layer 2 is covered with the light shieldingpart 6, the photocatalyst dose not act on the property variable layer 4 so that the property is not varied.

Next, a pixel part forming process (FIG. 5F) is carried out, wherein the pixel parts 7 of red (R), green (G) and blue (B) are formed by utilizing the property of the property-varied pattern 5 which is the property varied property variable layer 4. In the present invention, it is possible to form the high precision pixel part 7 easily since the property of the property variable layer 4 is varied in the property-varied pattern 5.

Moreover, in the present invention, since the pixel part and the light shielding part are formed in between the electrode layer and the photocatalyst containing layer, even though the transparent electrode layer is formed on the pixel part, the electrode layer is not influenced by the conductivity of the photocatalyst containing layer so that the high quality color filter can be obtained.

Hereinafter, the above mentioned processes will be explained respectively.

1. Photocatalyst Containing Layer Forming Process

First, the photocatalyst containing layer forming process in the present invention will be explained. The photocatalyst containing layer forming process of the present invention is a process in which the photocatalyst containing layer is formed on the transparent base material. The photocatalyst containing layer formed in this process may be formed from only the photocatalyst, or it may be formed by a mixture with the binder.

As an example of method for forming the photocatalyst containing layer formed from only the photocatalyst, vacuum film forming methods such as sputtering method, CVD method, vacuum deposition method and the like, or when the photocatalyst is a titanium dioxide, a method of forming an amorphous titania on the base member, and then, changing the phase into a crystalline titania by baking, can be listed. By forming the photocatalyst containing layer by the vacuum film formation method, a photocatalyst containing layer containing only a photocatalyst can be provided as an even film, and thereby, the property on the property variable layer can be varied evenly. Moreover, since it is formed only from the photocatalyst, compared to the case of using the binder, the property on the property variable layer can be varied efficiently.

In a case where the photocatalyst containing layer is formed from a mixture of the photocatalyst and the binder, it can be formed by dispersing the photocatalyst and the binder in a solvent, as needed with the other additives, so as to prepare a coating solution, and coating the coating solution on the transparent base material. In this case, there is an advantage that it is easy to form the photocatalyst containing layer. Further, in the present invention, the below mentioned light shielding part forming process is carried out after the photocatalyst containing layer forming process. In this light shielding part forming process, the thermal transfer method may be used as mentioned below. In this case, organic materials are used as the light shielding part. These organic materials generally have poor adhesion to the substance made from only inorganic material such as a glass, a titanium oxide or the like, and it may be difficult to be formed on the photocatalyst containing layer formed from only the titanium oxide. Therefore, when the below mentioned light shielding part is formed by the thermal transfer method, by using an organo polysiloxane or silane coupling agent as the binder in the photocatalyst containing layer, there is an advantage that the adhesion between the photocatalyst containing layer and the light shielding part can be improved. Moreover, by making the photocatalyst containing layer a layer containing the binder, when the below mentioned transparent base material is formed from inorganic materials, the photocatalyst containing layer itself can act as a component which improves the adhesion between the transparet base material and the light shielding part.

In this case, after the below mentioned light shielding part forming process, an energy irradiating process is preferably carried out, wherein the photocatalyst containing layer with the light shielding part formed is irradiated with the energy. This is because when an organic group exists on the surface of the photocatalyst containing layer, the adhesion of the photocatalyst containing layer and the property variable layer may be deteriorated. By decomposing and removing the organic group existing on the surface of the photocatalyst containing layer by a function of a photocatalyst due to an energy irradiation, the adhesion of the photocatalyst containing layer and the property variable layer can be improved.

As the solvent to be used to form such photocatalyst containing layer, alcohol based organic solvents such as an ethanol, and an isopropanol are preferable. The coating can be carried out by a known coating method such as spin coating, spray coating, dip coating, roll coating and bead coating. In the case an ultraviolet ray curing type component is contained in the binder, the photocatalyst containing layer can be formed by carrying out a curing process by irradiating an ultraviolet ray.

The materials and the like of the photocatalyst containing layer used in this process is the same as that explained in the section of the photocatalyst containing layer in the above "B. Color filter". Therefore, the explanation is omitted here.

2. Light Shielding Part Forming Process

Next, a light shielding part forming process of the method for manufacturing a color filter according to the present inveniton will be explained. The light shielding part forming process in the present invention is a process in which the light shielding part is formed on the photocatalyst containing layer formed in the photocatalyst containing layer forming process. The light shielding part formed in this process is used as a black matrix in the color filter of the present invention, further, it shields a function of a photocatalyst due to the energy irradiation.

In the present invention, the method for manufacturing the light shielding part is not particularly limited as long as it is possible to form the above mentioned light shielding part. For example, a method of forming a metal thin film of a chromium or the like in a thickness about 1,000 to 2,000 Å by a sputtering method, a vacuum deposition method or the like, and patterning the thin film by a photolithghraphy can be presented. Moreover, it may be formed by forming a resin layer of a polyimide resin, an acryl resin, an epoxy resin or the like containing light shielding particles of carbon fine particles, a metal oxide, an inorganic pigment, an organic pigment or the like, and pattening the resin layer by the photolithography method. Or it may be formed by forming a photosensitive resin layer containing a light shielding particle such as a carbon fine particle, a metal oxide or the like, and pattening the photosensitive resin layer by the photolithghraphy method.

Moreover, in the present invention, the light shielding part may be formed by the thermal transfer method. In the thermal transfer method, for example, the carbon fine particle, contained in the resin, is formed on a film such as a resin film via a light-heat conveting layer or delaminating layer or the like. It is a method to transfer the above mentioned carbon fine particle contained in the resin onto the photocatalyst containing layer by a function of the light-heat conveting layer, the delaminating layer or the like by placing the resin forming part of the film on the photocatalyst containing layer side and irradiating a laser or the like from the film side only onto the area where the light shielding part is formed. By this method, since the resin layer having light shielding property is formed on the film or the light-heat converting layer previously, there is no need to cure the light shielding part by energy irradiation to form the light shielding part. Therefore, the light shielding part can be formed thicker so that the light shielding part, which can easily prevent the color mixture of the pixel part, can be provided.

Further, in this case, to improve the adhesion of the light shielding part formed by the thermal transfer method and the photocatalyst containing layer, the below mentioned adhesion improving layer forming process is preferably carried out before the light shielding part forming process is carried out. This is because, by forming the adhesion improving layer in the adhesion improving layer forming process, the adhesion of the light shielding part and the photocatalyst containing layer can be improved. Moreover, in this case, the energy irradiating process is preferably carried out after the light shielding process of forming the light shielding part. Thereby, the adhesion of the photocatalyst containing layer and the property variable layer can be improved.

Here, for the materials and the like for the light shielding part used in this process is the same as that explained in the section of the light shielding part in the above "B. Color filter". Threrfore, the explanation is omitted.

3. Property Variable Layer Forming Process

Next, a property variable layer forming process of the method for manufacturing a color filter in the present invention will be explained. The property variable layer forming process of the present invention is a process in which the property variable layer is formed so as to cover the light shielding part and the photocatalyst containing layer formed in the above mentioned process. The property variable layer formed in this process is a layer whose property is varied by a function of a photocatalyst due to an energy irradiation. The method for forming the property variable layer in the present invention is not particularly limited as long as a layer as mentioned above can be formed and it is optionally selected according to the kind of the intended property variable layer.

In the present invention, the property variable layer is preferably a wettability variable layer or a decomposition removal layer. Such wettability variable layer or decomposition removal layer can be formed by, for example, preparing a coating solution by dispersing materials comstituting the wettability variable layer and the decomposition removal layer into a solvent and coating the coating solution onto a base material. The coating may be carried out by known coating methods such as a spin coating, a spray coating, a dip coating, a roll coating and bead coating. Moreover, when the wettability variable layer is a monolayer, a thermal CVD method and the like can be used.

The wettability variable layer, decomposition removal layer, the method for forming and the like is the same as that explained in the section of the property variable layer in the above "B. Color filter". Therefore, the explanation is omitted here.

4. Property-Varied Pattern Forming Process

Next, a property-varied pattern forming process used in the present invention will be explained. After the above mentioned property variable layer forming process, the property-varied pattern forming process is carried out, wherein the property-varied pattern, which is the property varied property variable layer, is formed by irradiating the property variable layer with the energy. By forming the property-varied pattern, which is the property varied property variable layer, in a pattern, as the pattern of the pixel part, in this process, it becomes possible to form the pixel part easily in the below mentioned pixel part forming process.

In the present inveniton, since the light shielding part is formed on the photocatalyst containing layer, even if the energy is irradiated onto the entire surface, a function of the photocatalyst dose not show in the area covered with the light shielding part so that the property of the property variable layer on the light shielding part is not varied.

Figure 6:
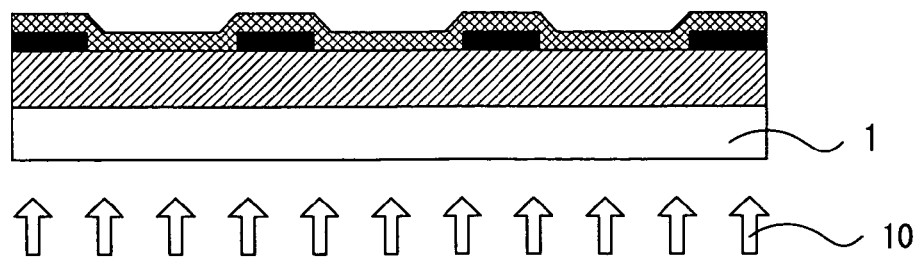
FIG. 6 is a view showing an example of an energy irradiation in the method for manufacturing a color filter according to the present invention.

Therefore, in the present invention, as shown in FIG. 5D, the energy 10 may be irradiated from the property variable layer side, or as shown in FIG. 6, the energy 10 may be irradiated from the transparent base material 1 side.

Figure 7:
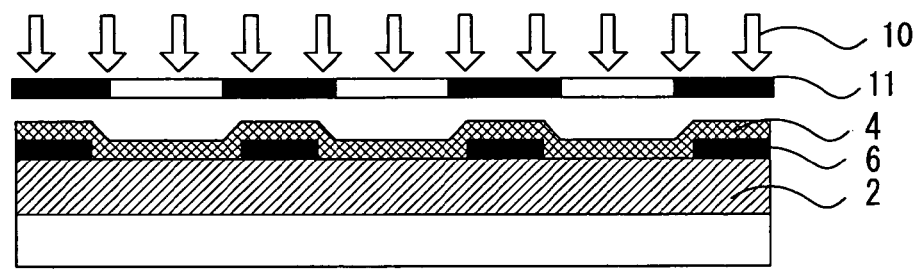
FIG. 7 is a view showing another example of an energy irradiation in the method for manufacturing a color filter according to the present invention.

In a case where the intended property-varied pattern is different from the pattern of the area where the light shielding part is not formed, as shown in FIG. 7, the energy 10 can be irradiated by using a mask such as the photomask 11.

Here, the energy irradiation (exposure) in the present invention includes the irradiation of any energy line which can vary the property of the property variable layer surface, and it is not limited to the visible light irradiation.

In the present invention, the wavelength of the light used in the energy irradiation is generally set in a range of 400 nm or less, preferably in a range of 380 nm or less. This is because, as mentioned above, the photocatalyst preferably used in the photocatalyst containing layer is a titanium dioxide, and the above mentioned wavelength is preferable as the energy to activate the photocatalyst function by the titanium dioxide.

As the light source used in the energy irradiation, a mercury lamp, a metal halide lamp, a xenon lamp, an eximer lamp and other light sources can be listed.

Here, as the irradiating amount upon the energy irradiation is set in an irradiating amount which is required for the property variation of the property variable layer surface.

Moreover in this case, the sensitivity can be improved by irradiating the energy while heating the property variable layer and it is preferable in terms of efficient proprty variation. Specifically, it is preferable to heat in a range of 30° C. to 80° C.

5. Pixel Part Forming Process

Next, a pixel part forming process of the method for manufacturing a color filter according to the present invention will be explained. The pixel part forming process is a process in which the pixel part is formed on the property-varied pattern, which is the property varied property variable layer, formed in the property-varied pattern forming process. In the present invention, since the property-varied pattern, which is the property varied property variable layer, is formed, the pixel part can be formed easily by utilizing the property difference such as the wettability or the convex-concave. Moreover, in the present invention, since the pixel part is formed on the property-varied pattern, the pixel part can be formed evenly. Therefore, the pixel part without color missing nor color unevenness can be formed.

The formation of the pixel part in this process is not particularly limited as long as the pixel part can be formed on the property-varied pattern, and generally used method for forming the pixel part can be used. However, in the present invention, an ink jet method is preferably used. Thereby, the three colors of red (R), green (G) and blue (B) can be formed easily in on process, and also, the high precision pixel part with no color mixture can be obtained. In this case, as the ink jet apparatus to be used, although it is not particularly limited, the ink jet apparatus using the various kinds of methods such as a method of continuously discharging a charged ink and controlling the same by the magnetic field, a method of intermittently discharging an ink using a piezoelectric element, and a method of heating an ink and intermittently discharging the same utilizing the bubbles, can be used.

Moreover, as kind of the ink used for the ink jet method, a curing type ink such as an UV curing ink or a thermosetting ink and the like can be preferably used.

The ink and the like used for forming the pixel part in this process is the same as that explained in the section of the pixel part of the above "B. Color filter". Therefore, the explanation is omitted.

6. Adhesion Improving Layer Forming Process

Moreover, in the present invention, an adhesion improving layer forming process is preferably carried out, wherein the adhesion improcing layer is formed on the photocatalyst containing layer formed in the photocatalyst containing layer forming process. Thereby, when the photocatalyst containing layer formed in the photocatalyst containing layer forming process is formed from only the photocatalyst that is an inorganic material, the adhesion to the light shielding part formed on the photocatalyst containing layer can be improved. Therefore, the kind of the photocatalyst containing layer is not limited that the photocatalyst containing layer may contain the binder, or it may be formed from only the photocatalyst.

The material for the adhesion improving layer used in the present invention is not particularly limited as long as the adhesion of the photocatalyst containing layer and the light shielding part can be improved. For example, the binder and the like used in the photocatalyst containing layer forming process can be used. In the present inventnion, the silane coupling agent is preferably used.

In the present invention, the adhesion improving layer can be formed by coating the above mentioned material by a known coating method such as a spin coating, a spray coating, a dip coating, a roll coating and bead coating.

In a case where the adhesion improving layer is formed in this process, after the light shielding part forming process, the below mentioned energy irradiating process is preferably carried out before the property variable layer forming process. Thereby, the adhesion of the photocatalyst containing layer and the property variable layer can be improved.

7. Energy Irradiating Process

In the present invention, when the light shielding part forming process is carried out by the thermal transfer method, when the photocatalyst containing layer containes the above mentioned binder or when the adhesion improving layer is formed, the energy irradiating process of irradiating the photocatalyst containing layer with the energy is preferably carried out after the light shielding part forming process.

When the light shiedling part forming process is carried out by the thermal transfer method, the adhesion improving layer is preferably formed, and the photocatalyst containing layer preferably contain an organo polysiloxane or a silane coupling agent as the binder. Thereby, the adhesion of the photocatalyst containing layer and the light shielding part can be improved. However, when an organic group or the like exists on the formed surface of the property variable layer formed in the property variable layer forming process, the adhesion of the photocatalyst containing layer and the property variable layer may be deteriorated by a function of the organic group on the surface of the photocatalyst containing layer. Thrrefore, by carrying out the energy irradiating process of irradiating the photocatalyst containing layer with the energy after the light shielding part forming process, the organic group existing on the surface of the photocatalyst containing layer can be decomposed and removed by a function of the photocatalyst contained in the photocatalyst containing layer itself. Thus, the adhesion of the photocatalyst containing layer and the property variable layer can be improved.

Such erergy irradiation may be carried out on the entire surface from the photocatalyst containing layer side or may be carried out on the entire surface from the transparent base material.

The wavelength, kind or the like of the irradiated energy is the same as that used in the above mentioned property-varied pattern. Therefore, the explanation is omitted.

The present invention is not limited to the above mentioned embodiments. The above mentioned embodiments are merely examples, and any one having the substantially same configuration as the technological idea disclosed in the claims of the present invention and the same effects is included in the technological scope of the present invention.

EXAMPLES

Hereinafter, the present invention will be explained in further details with reference to the examples.

Example 1

(Formation of a Photocatalyst Containing Layer)

A transparent photocatalyst containing layer (thickness: 0.15 μm) was formed by coating a titanium oxide water dispersing element ST-K01 (manufactured by Ishihara Sangyo Kaisha, Ltd.) as a photocatalyst, on a glass substrate (NH Techno Glass NA35) by a spin coater and carrying out a drying treatment at 150° C. for 10 minutes.

(Formation of a Light Shielding Part)

A light shielding part pattern of 1.2 μm thickness, 20 μm width, 80 μm×280 μm opening part was formed by coating a black color resist containing a carbon black (V-259BK resist manufactured by Nippon Steel Chemical Co., Ltd.) on the glass substrate with the photocatalyst containing layer formed thereon, exposing, developping and carrying out a postbake treatment.

(Formation of a Wettability Variable Layer)

A wettability variable layer was formed so as to cover the photocatalyst containing layer and the light shielding part by heating a fluoro alkyl silane (TSL8233, manufactured by GE Toshiba Silicones Co., Ltd.) at 240° C., and applying its vapor to the glass substrate with the light shielding part formed thereon. A contact angle of the formed wettability variable layer to water was 110°.

(Exposure)

The entire surface of the glass substrate with the wettability variable layer formed thereon was irradiated with the energy of 700 mJ/cm$^2$ (365 nm), from the wettability variable layer side, by using a high pressure mercury lamp (scattered light). As a result, only the wettability of the opening part was varied and the contact angle to water was 10° or less.

(Formation of a Pixel Part)

By using a piezoelectric driving type ink jet apparatus, UV curing type polyfunctional acrylate monomer inks (coloring inks) of each RGB colors containing 5 parts by weight of a pigment, 20 parts by weight of a solvent, 5 parts by weight of a polymerization initiating agent, and 70 parts by weight of a UV curing resin were adhered on the opening part for coloring, and the UV treatment was carried out for curing. For the red, green and blue inks, as the solvent, a polyethylene glycol monomethyl ethyl acetate, as the polymerization initiating agent, IRUGACURE 369 (product name, manufactured by Chiba Specialty Chemicals), and as the UV curing resin, a DPHA (dipenta erythritol hexaacrylate (manufactured by NIPPON KAYAKU CO., LTD.) were used. Moreover, as the pigment, for the red ink, C. I. Pigment Red 177, for the green ink, C. I. Pigment Green 36, and for the blue ink, C. I. Pigment Blue 15+C. I. Pigment Violet 23 were used, respectively.

Example 2

(Formation of a Photocatalyst Containing Layer)
A transparent photocatalyst containing layer (thickness: 0.15 μm) was formed by coating a titanium oxide water dispersing element ST-K01 (manufactured by Ishihara Sangyo Kaisha, Ltd.) as a photocatalyst, on a glass substrate (NH Techno Glass NA35) by a spin coater and carrying out a drying treatment at 150° C. for 10 minutes.

(Formation of a Light Shielding Part)
A light shielding part pattern of 1.2 μm thickness, 20 μm width, 80 μm×280 μm opening part was formed by coating a black color resist containing a carbon black (V-259BK resist manufactured by Nippon Steel Chemical Co., Ltd.) on the glass substrate with the photocatalyst containing layer formed thereon, exposing, developping and carrying out a postbake treatment.

(Formation of a Wettability Variable Layer)
2 parts by weight of EUPIRON Z400 (manufactured by Mitsubishi Gas Chemical Company, Inc.) containing a polycarbonate as the main component was dissolved into 30 parts by weight of a dichloro methane and 70 parts by weight of a 112 trichloro ethane, and further, 1 part by weight of a fluorine based surfactant (FLUORAD FC-4430 manufactured by 3M) was added so as to provide a decomposition removal layer composition.
By coating the above mentioned decomposition removal layer composition on the glass substrate, with the light shielding layer formed thereon, by a spin coater, a decomposition removal layer (thickness 0.05 μm) was formed so as to cover the photocatalyst containing layer and the light shielding part. A contact angle of the formed decomposition removal layer to water was 87°.

(Exposure)
The entire surface of the glass substrate with the wettability variable layer formed thereon was irradiated with the energy of 700 mJ/cm$^2$ (365 nm), from the wettability variable layer side, by using a high pressure mercury lamp (scattered light). As a result, only the decomposition removal layer of the opening part was decomposed and removed and the contact angle to water was 10° or less.

(Formation of a Pixel Part)
Next, by using a piezoelectric driving type ink jet apparatus, thermosetting type inks (coloring inks) of each RGB colors containing 5 parts by weight of a pigment, 20 parts by weight of a solvent and 75 parts by weight of a binder were adhered on the opening part for coloring, and the UV treatment was carried out for curing.

Example 3

(Formation of an Organo Polysiloxane Containing Photocatalyst Containing Layer)
After combining 5 g of an amino group containing silane compound S320 (manufactured by Chisso Corporation) and 2 g of water, the mixture was agitated for 8 hours. A transparent organo polysiloxane containing photocatalyst containing layer (thickness: 0.15 μm) was formed by coating a mixture of 0.1 g of the above solution and 5 g of a titanium oxide water dispersing element ST-K01 (manufactured by Ishihara Sangyo Kaisha, Ltd.) as a photocatalyst, on a glass substrate (NH Techno Glass NA35) by a spin coater and carrying out a drying treatment at 150° C. for 10 minutes.

(Formation of a Light Shielding Part)
A light shielding part pattern of 2 μm thickness, 20 μm width, 80 μm×280 μm opening part was formed by closely contacting a light-heat converting layer, a thermal transfer film with a transfer layer comprising a carbon black and an epoxy resin binder formed thereon, onto the glass substrate with the photocatalyst containing layer and the adhesion improving layer formed thereon, drawing with an infrared laser, transferring the transfer layer and carrying out a postbake treatment.

(Decomposition of an Organic Group)
The entire surface of the glass substrate with the light shielding part formed thereon was irradiated with the energy of 1000 mJ/cm$^2$ (365 nm) to decompose and remove an amino group containing organic group existing on the opening part.

(Formation of a Wettability Variable Layer)
A wettability variable layer (0.05 μm) was formed so as to cover the photocatalyst containing layer and the light shielding part by combining 5 g of a fluoro alkyl silane (TSL8233, manufactured by GE Toshiba Silicones Co., Ltd.), 2 g of a tetramethoxy silane and 2 g of 1 normal hydrochloric acid for 8 hours, coating the solution to the glass substrate with the light shielding part formed thereon, and heating at 150° C. for 10 minutes. A contact angle of the formed wettability variable layer to water was 112°.

(Exposure)
The entire surface of the glass substrate with the wettability variable layer formed thereon was irradiated with the energy of 1200 mJ/cm$^2$ (365 nm), from the wettability variable layer side, by using a high pressure mercury lamp (scattered light). As a result, only the wettability of the opening part was varied and the contact angle to water was 10° or less.

(Formation of a Pixel Part)
By using a piezoelectric driving type ink jet apparatus, UV curing type polyfunctional acrylate monomer inks (coloring inks) of each RGB colors containing 5parts by weight of a pigment, 20 parts by weight of a solvent, 5 parts by weight of a polymerization initiating agent, and 70 parts by weight of a UV curing resin were adhered on the opening part for coloring, and the UV treatment was carried out for curing. For the red, green and blue inks, as the solvent, a polyethylene glycol monomethyl ethyl acetate, as the polymerization initiating agent, IRUGACURE 369 (product name, manufactured by Chiba Specialty Chemicals), and as the UV curing resin, a DPHA (dipenta erythritol hexaacrylate (manufactured by NIPPON KAYAKU CO., LTD.) were used. Moreover, as the pigment, for the red ink, C. I. Pigment Red 177, for the green ink, C. I. Pigment Green 36, and for the blue ink, C. I. Pigment Blue 15+C. I. Pigment Violet 23 were used, respectively.

Example 4

(Formation of a Photocatalyst Containing Layer)
A transparent photocatalyst containing layer (thickness: 0.15 μm) was formed by coating a titanium oxide water dispersing element ST-K01 (manufactured by Ishihara Sangyo Kaisha, Ltd.) as a photocatalyst, on a glass substrate (NH Techno Glass NA35) by a spin coater and carrying out a drying treatment at 150° C. for 10 minutes.

(Formation of an Adhesion Improving Layer)

After combining 5 g of an amino group containing silane compound S320 (manufactured by Chisso Corporation) and 2 g of water, the mixture was agitated for 8 hours. A transparent adhesion improving layer (thickness: 0.1 μm) was formed by coating a mixture on the glass substrate, with the photocatalyst containing layer formed thereon, by a spin coater and carrying out a drying treatment at 150° C. for 10 minutes.

(Formation of a Light Shielding Part)

A light shielding part pattern of 1.8 μm thickness, 20 μm width, 80 μm×280 μm opening part was formed by closely contacting a light-heat converting layer, a thermal transfer film with a transfer layer comprising a carbon black and an epoxy resin binder formed thereon, onto the glass substrate with the photocatalyst containing layer and the adhesion improving layer formed thereon, drawing with an infrared laser, transferring the transfer layer and carrying out a postbake treatment.

(Decomposition of an Organic Group)

The entire surface of the glass substrate with the light shielding part formed thereon was irradiated with the energy of 1000 mJ/cm$^2$ (365 nm) to decompose and remove an amino group containing organic group existing on the opening part.

(Formation of a Wettability Variable Layer)

A wettability variable layer was formed so as to cover the adhesion improving layer, the photocatalyst containing layer and the light shielding part by heating a fluoro alkyl silane (TSL8233, manufactured by GE Toshiba Silicones Co., Ltd.) at 240° C., and applying its vapor to the glass substrate with the light shielding part formed thereon. A contact angle of the formed wettability variable layer to water was 110°.

(Exposure)

The entire surface of the glass substrate with the wettability variable layer formed thereon was irradiated with the energy of 800 mJ/cm$^2$ (365 nm), from the wettability variable layer side, by using a high pressure mercury lamp (scattered light). As a result, only the wettability of the opening part was varied and the contact angle to water was 10° or less.

(Formation of a Pixel Part)

By using a piezoelectric driving type ink jet apparatus, UV curing type polyfunctional acrylate monomer inks (coloring inks) of each RGB colors containing 5 parts by weight of a pigment, 20 parts by weight of a solvent, 5 parts by weight of a polymerization initiating agent, and 70 parts by weight of a UV curing resin were adhered on the opening part for coloring, and the UV treatment was carried out for curing. For the red, green and blue inks, as the solvent, a polyethylene glycol monomethyl ethyl acetate, as the polymerization initiating agent, IRUGACURE 369 (product name, manufactured by Chiba Specialty Chemicals), and as the UV curing resin, a DPHA (dipenta erythritol hexaacrylate (manufactured by NIPPON KAYAKU CO., LTD.) were used. Moreover, as the pigment, for the red ink, C. I. Pigment Red 177, for the green ink, C. I. Pigment Green 36, and for the blue ink, C. I. Pigment Blue 15+C. I. Pigment Violet 23 were used, respectively.

What is claimed is:

1. A pattern forming body comprising: a base material; a photocatalyst containing layer, comprising at least a photocatalyst, formed on the base material; a protecting part formed on the photocatalyst containing layer; a property variable layer formed to cover the photocatalyst containing layer and the protecting part, in which a surface property thereof is varied by a function of a photocatalyst due to an energy irradiation and no photocatalyst is contained, and a property-varied pattern which is a property varied property variable layer.

2. A color filter wherein the base material of the pattern forming body according to claim 1 is a transparent base material, the protecting part is a light shielding part, and a pixel part is formed according to the property-varied pattern.

3. The color filter according to claim 2, wherein the property variable layer is a wettability variable layer whose contact angle to a liquid is reduced by a function of a photocatalyst due to an energy irradiation.

4. The color filter according to claim 3, wherein the wettability variable layer is a layer containing an organo polysiloxane.

5. The color filter according to claim 4, wherein the organo polysiloxane is an organo polysiloxane as a hydrolyzed condensate or a cohydrolyzed condensate of one kind or two or more kinds of silicon compounds represented by $Y_nSiX_{(4-n)}$ here, Y is an alkyl group, a fluoro alkyl group, a vinyl group, an amino group, a phenyl group, an epoxy group, or an organic group containing them, X is an alkoxyl group, or a halogen, and n is an integer from 0 to 3).

6. The color filter according to claim 5, wherein a carbon number of Y, which constitutes the organo polysiloxane, is in a range of 1 to 20.

7. The color filter according to claim 3, wherein the wettability variable layer is a monolayer.

8. The color filter according to claim 7, wherein the monolayer is formed from a silane compound comprising an organic chain.

9. The color filter according to claim 8, wherein a carbon number which constitutes the organic chain is in a range of 1 to 20.

10. The color filter according to claim 8, wherein the silane compound is a fluoroalkylsilane.

11. The color filter according to claim 2, wherein the property variable layer is a decomposition removal layer which is decomposed and removed by an action of a photocatalyst due to an energy irradiation.

12. The color filter according to claim 11, wherein a contact angle of the decomposition removal layer to a liquid having a 40 mN/m surface tension is 50° or more, and a contact angle of the photocatalyst containing layer to a liquid having a 40 mN/in surface tension is 49° or less.

13. The color filter according to claim 11, wherein the decomposition removal layer is a monolayer.

14. The color filter according to claim 2, wherein the pixel part is formed by an ink jet method.

15. The color filter according to claim 14, wherein a curing type ink is used for the pixel part formed by an ink jet method.

16. The color filter according to claim 15, wherein the curing type ink is an UV curing ink.

17. The color filter according to claim 15, wherein the curing type ink is a thermosetting ink.

18. The color filter according to claim 2, wherein the light shielding part is formed by a thermal transfer method.

19. The color filter according to claim 18, wherein an adhesion improving layer is formed on the photocatalyst containing layer.

20. The color filter according to claim 2 comprising an electrode layer on the pixel part.

21. A method for manufacturing a color filter comprising:
a photocatalyst containing layer forming process of forming a photocatalyst containing layer, comprising at least a photocatalyst, on a transparent base material;
a light shielding part forming process of forming a light shielding part on the photocatalyst containing layer;
a property variable layer forming process of forming a property variable layer, in which a property thereof is varied by a function of a photocatalyst due to an energy irradiation and no photocatalyst is contained, so as to cover the photocatalyst containing layer and the light shielding part;
a property-varied pattern forming process of forming a property-varied pattern which is the property varied layer whose property is varied by irradiating the property variable layer with an energy; and
a pixel part forming process of forming a pixel part on the property-varied pattern.

22. The method for manufacturing a color filter according to claim 21, wherein the energy irradiation is carried out on the entire surface from the property variable layer side.

23. The method for manufacturing a color filter according to claim 21, wherein the energy irradiation is carried out on the entire surface from the transparent base material side.

24. The method for manufacturing a color filter according to claim 21, wherein the energy irradiation is carried out via a photomask.

25. The method for manufacturing a color filter according to claim 21, wherein the property variable layer is a wettability variable layer whose contact angle to a liquid is reduced by a function of a photocatalyst due to an energy irradiation.

26. The method for manufacturing a color filter according to claim 21, wherein the property variable layer is a decomposition removal layer which is decomposed and removed by a function of a photocatalyst due to an energy irradiation.

27. The method for manufacturing a color filter according to claim 21, wherein the pixel part is formed by an ink jet method using a curing type ink.

28. The method for manufacturing a color filter according to claim 21, wherein the light shielding part forming process is carried out by a photolithography method.

29. The method for manufacturing a color filter according to claim 21, wherein the light shielding part forming process is carried out by a thermal transfer method.

30. The method for manufacturing a color filter according to claim 29 comprising an adhesion improving layer forming process, of forming an adhesion improving layer, after the photocatalyst containing layer forming process.

31. The method for manufacturing a color filter according to claim 30 comprising an energy irradiating process, of irradiating the photocatalyst containing layer with the energy, after the light shielding part forming process.

32. The method for manufacturing a color filter according to claim 29, wherein the photocatalyst containing layer formed in the photocatalyst containing layer forming process comprises an organo polysiloxane.

33. The method for manufacturing a color filter according to claim 29, wherein the photocatalyst containing layer formed in the photocatalyst containing layer forming process comprises a silane coupling agent, and the silane coupling agent is an simple substance, a hydrolyzed condensate or a cohydrolyzed condensate of one kind or two or more kinds of silicon compounds represented by $Y_n SiX_{(4-n)}$ here, Y is an alkyl group, a fluoro alkyl group, a vinyl group, an amino group, a phenyl group, an epoxy group, or an organic group containing them, X is an alkoxyl group, or a halogen, and n is an integer from 0 to 3).

* * * * *